(12) United States Patent
Chui et al.

(10) Patent No.: US 6,549,674 B1
(45) Date of Patent: Apr. 15, 2003

(54) IMAGE COMPRESSION BASED ON TILED WAVELET-LIKE TRANSFORM USING EDGE AND NON-EDGE FILTERS

(75) Inventors: Charles K. Chui, Menlo Park, CA (US); Hong-Ye Gao, Milpitas, CA (US); Lefan Zhong, Santa Clara, CA (US)

(73) Assignee: Picsurf, Inc., Mountain View, CA (US)

( * ) Notice: Subject to any disclaimer, the term of this patent is extended or adjusted under 35 U.S.C. 154(b) by 0 days.

(21) Appl. No.: 09/687,467

(22) Filed: Oct. 12, 2000

(51) Int. Cl.[7] .............................. G06K 9/36; G06K 9/46
(52) U.S. Cl. .................... 382/240; 382/239; 382/251; 382/264
(58) Field of Search ................................ 382/232, 240, 382/239, 251, 260, 263, 264, 265, 266, 268; 375/240.02, 240.03, 240.11, 240.19; 348/398.1, 437.1, 438.1

(56) References Cited

U.S. PATENT DOCUMENTS

| | | | | |
|---|---|---|---|---|
| 5,025,309 A | * | 6/1991 | Isnardi | 375/240.25 |
| 5,309,232 A | * | 5/1994 | Hartung et al. | 375/240.11 |
| 5,481,308 A | | 1/1996 | Hartung et al. | 348/398 |
| 5,684,714 A | * | 11/1997 | Yogeshwar et al. | 382/232 |
| 5,926,791 A | | 7/1999 | Ogata et al. | 382/240 |
| 5,977,996 A | | 11/1999 | Kondo | 345/516 |
| 6,125,143 A | * | 9/2000 | Suzuki et al. | 375/240.11 |
| 6,141,446 A | * | 10/2000 | Boliek et al. | 382/240 |
| 6,163,629 A | * | 12/2000 | Cheung et al. | 382/260 |
| 6,236,757 B1 | * | 5/2001 | Zeng et al. | 382/240 |
| 6,252,989 B1 | * | 6/2001 | Geisler et al. | 382/240 |
| 6,282,322 B1 | * | 8/2001 | Rackett | 382/251 |

FOREIGN PATENT DOCUMENTS

WO  PCT/US01/31870  3/2002

* cited by examiner

*Primary Examiner*—Timothy M. Johnson
(74) *Attorney, Agent, or Firm*—Pennie & Edmonds LLP

(57) ABSTRACT

An image processing system tiles an image data array. Each tile of image data is processed by applying a family of transform layers to the tile of image data so as to generate successive sets of transform coefficients. Each set of transform coefficients include edge coefficients positioned at outside boundaries of the set of transform coefficients and non-edge coefficients positioned at interior locations of the set of transform coefficients. The transform filters include a short edge transform filter that is applied to image data at boundaries of the tile and to coefficients positioned at and near boundaries of each of the earlier sets of transform coefficients so as to generate the edge coefficients, and a long interior filter that is applied to image data at interior locations of the tile and to coefficients at interior locations of the earlier sets of transform coefficients so as to generate the non-edge coefficients.

22 Claims, 18 Drawing Sheets

Data Representing One Tile t
220

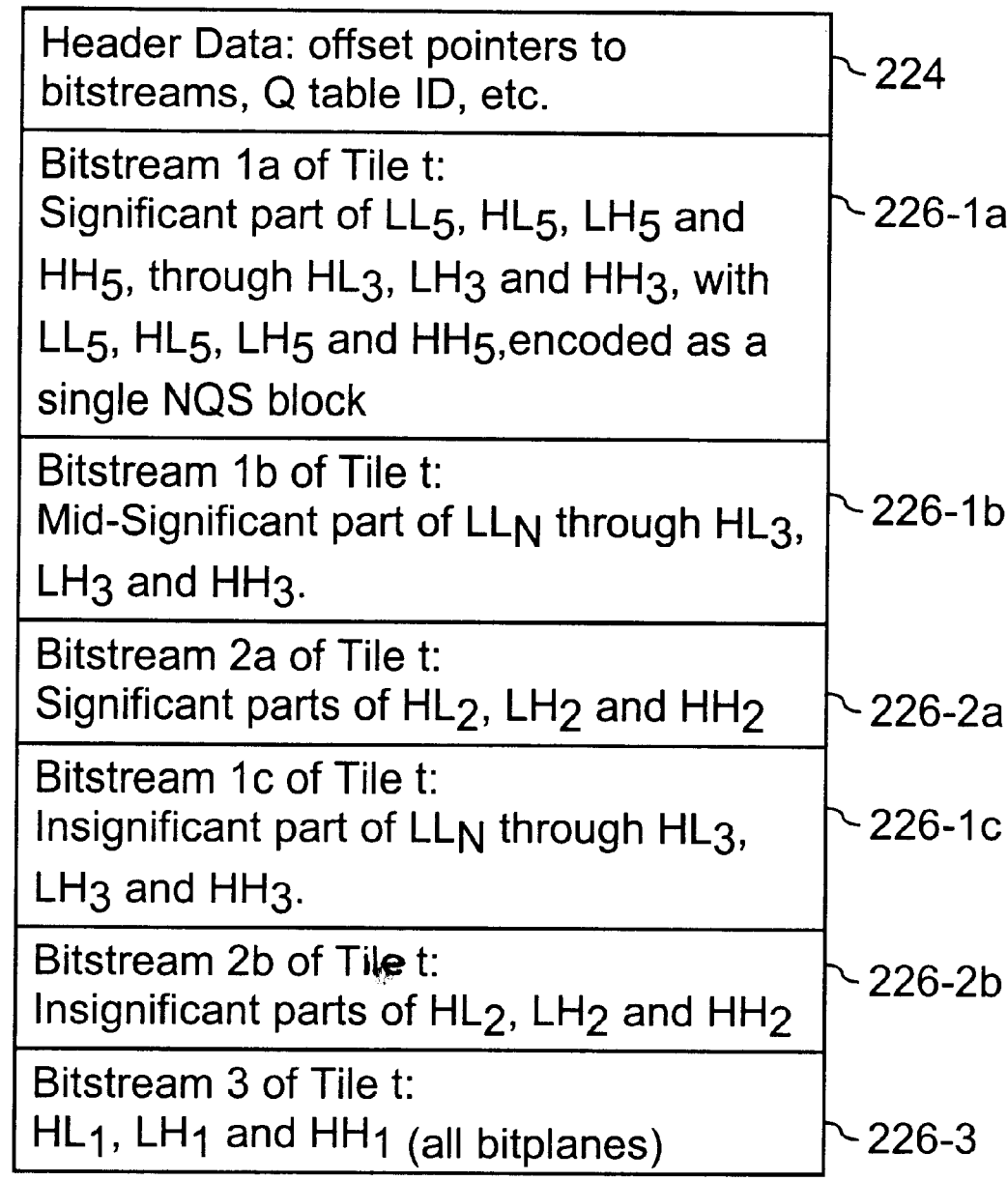

| Header Data: offset pointers to bitstreams, Q table ID, etc. | 224 |

Bitstream 1a of Tile t: Significant part of $LL_5$, $HL_5$, $LH_5$ and $HH_5$, through $HL_3$, $LH_3$ and $HH_3$, with $LL_5$, $HL_5$, $LH_5$ and $HH_5$, encoded as a single NQS block — 226-1a Bitstream 1b of Tile t: Mid-Significant part of $LL_N$ through $HL_3$, $LH_3$ and $HH_3$. — 226-1b Bitstream 2a of Tile t: Significant parts of $HL_2$, $LH_2$ and $HH_2$ — 226-2a Bitstream 1c of Tile t: Insignificant part of $LL_N$ through $HL_3$, $LH_3$ and $HH_3$. — 226-1c Bitstream 2b of Tile t: Insignificant parts of $HL_2$, $LH_2$ and $HH_2$ — 226-2b Bitstream 3 of Tile t: $HL_1$, $LH_1$ and $HH_1$ (all bitplanes) — 226-3

FIG. 5D

Forward Transform
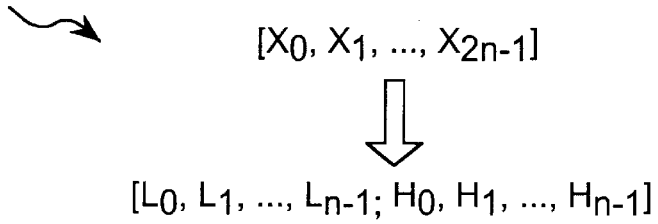
FIG. 7A
| $X_0$ | $X_1$ | $X_2$ | $X_3$ | $X_4$ | $X_5$ | $X_6$ | $X_7$ | $X_8$ | $X_9$ | $X_{10}$ | $X_{11}$ | $X_{12}$ | $X_{13}$ | $X_{14}$ | $X_{15}$ |
|---|---|---|---|---|---|---|---|---|---|---|---|---|---|---|---|
| $Y_0$ | | $Y_1$ | | $Y_2$ | | $Y_3$ | | $Y_4$ | | $Y_5$ | | $Y_6$ | | $Y_7$ | |
| $L_0$ | | $L_1$ | | $L_2$ | | $L_3$ | | $L_4$ | | $L_5$ | | $L_6$ | | $L_7$ | |
| $H_0$ | | $H_1$ | | $H_2$ | | $H_3$ | | $H_4$ | | $H_5$ | | $H_6$ | | $H_7$ | |
FIG. 7B
Inverse Transform
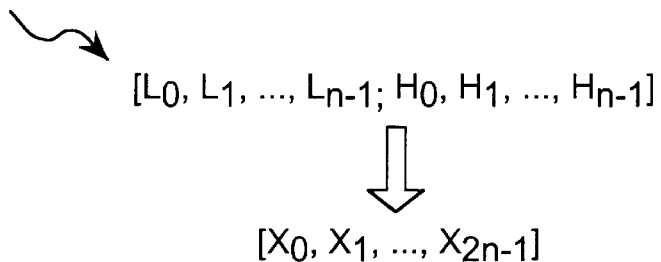
FIG. 7C

| $u_{ij}^{(3)}$ HL$_3$ | $u_{ij}^{(2)}$ HL$_2$ | $u_{ij}^{(1)}$ HL$_1$ |
| $v_{ij}^{(3)}$ LH$_3$ | $w_{ij}^{(3)}$ HH$_3$ | |
| $v_{ij}^{(2)}$ LH$_2$ | $w_{ij}^{(2)}$ HH$_2$ | |
| $v_{ij}^{(1)}$ LH$_1$ | | $w_{ij}^{(1)}$ HH$_1$ |

FIG. 8

Example
Encoding of Coefficients: 31, 0, -5, -2 significant part (threshold=3 bits):
POS 1, NEG insignificant part:
111, 01, NEG 0

(MSB of each coefficient is known from MaxbitDepth values)

IMAGE COMPRESSION BASED ON TILED WAVELET-LIKE TRANSFORM USING EDGE AND NON-EDGE FILTERS

The present invention relates generally to the processing, compression, communication and storage of images in computer systems, personal digital assistants, digital cameras and other devices, and particularly to an image management system and method in which digitally encoded images can be viewed in any specified window size and at a number of resolutions, and can be printed, cropped, and otherwise manipulated.

BACKGROUND OF THE INVENTION

An image may be stored at a number of resolution levels. The encoded image data for a lower resolution level is smaller, and thus takes less bandwidth to communicate and less memory to store than the data for a higher resolution level. When an image is stored for multi-resolution use, it would be desirable for the image data to be segregated into an ordered group of sets or subfiles, where each additional subfile provides the additional data needed to increase the resolution of the image from one level to the next. Further, it would be desirable for the quantity of image data in each subfile, for increasing the image resolution by a particular factor (such as 4), to be approximately proportional to the associated increase in resolution. For instance, if each resolution level differs from its neighboring resolution levels by a factor of 4 (e.g., level 0: 32×32, level 1: 64×64, level 2: 128×128, and so on), then the quantity of encoded image data for each resolution level should be approximately 25% as much as the quantity of encoded image data for the next higher resolution level. From another viewpoint, the quantity of data in the subfile(s) used to increase the image resolution from a first level to the next should, ideally, be approximately three times as much as the quantity of data in the subfile(s) for the first level.

It is well known that wavelet compression of images automatically generates several resolution levels. In particular, if N "layers" of wavelet transforms are applied to an image, then N+1 resolution levels of data are generated, with the last LL subband of data comprising the lowest resolution level and all the subbands of data together forming the highest resolution level. For convenience, the "layers" of wavelet transforms will sometimes be called "levels". Each of these resolution levels differs from its neighbors by a factor of two in each spatial dimension. We may label these resolution levels as Level 0 for the lowest, thumbnail level to Level N for the highest resolution level, which is the resolution of the final or base image.

A first aspect of the present invention is based on two observations. The first such observation is that, when using conventional as well as most proprietary data compression and encoding methods, the quantity of data in the N levels generated by wavelet compression tends to decrease in a geometric progression. For instance, the quantity of data for resolution Level 0 is typically about 80% of the quantity of data for resolution Level 1, whereas ideally it should about 25% of the quantity of data for resolution Level 1. As a result, the data for Level 0 contains significantly more data than is needed to display the Level 0 image. Alternately stated, the data for Level 0 gives unnecessarily high quality for the low resolution display at Level 0, and therefore gives less compression than could potentially be obtained by providing only the information needed for displaying the image at the Level 0 resolution level.

The second observation is that the low resolution image data coefficients are quantized for full resolution display, not for low resolution display, because these data coefficients are used not only for generating a low resolution representation of the image, but are also used when generating the higher resolution representations of the image.

In accordance with this first aspect of the present invention, as already indicated above, it would be desirable for the quantity of image data in the subarray or subfile for each resolution level to be approximately proportional to the increase in resolution associated with that resolution level.

A second aspect of the present invention is based on the observation that wavelet transforms are conventionally applied across tile or block boundaries of an image to avoid tile or block boundary artifacts in the regenerated image. A wavelet transform may be implemented as a FIR (finite impulse response) filter having an associated length. The "length" indicates the number of data samples that are used to generate each coefficient. Wavelet transforms are generally symmetric about their center, and when the filter that implements the wavelet transform is at the edge of a tile or block, typically half or almost half of the filter will extend into a neighboring block or tile. As a result it is usually necessary to keep not only part of the neighboring tiles in memory while wavelet transforming a tile of an image, it also necessary to keep in memory the edge coefficients of the neighboring tiles for each level of the wavelet transform. Thus, avoiding tiling effects (also called tile border effects or artifacts or edge artifacts) typically increases the memory requirements of the computer or device performing the wavelet transforms on an image, and may also increase the complexity of the transform procedure because of the need to keep track of the memory locations of edge data and coefficients from the neighboring tiles or blocks. In accordance with the second aspect of the present invention, it would be highly desirable to have a wavelet or wavelet-like transform that can be applied to just the data for the image block being processed, without having to also apply the transform to data from neighboring blocks, and without creating noticeable edge artifacts. Having such a transform would decrease memory requirements and might simplify the wavelet compression of images.

It is well known in the prior art that digital images can be processed a portion at a time, instead of all at once, thereby reducing memory requirements. For instance, the DCT transform used for JPEG compression and encoding of images is traditionally used on tiles of 8×8 pixels. However, a well known problem with tiling an image for processing is that the tiling produces undesirable tile border effects. The border effects of DCT tiling in JPEG images are considered to be acceptable because the very small size of the tiles makes the tiling effect relatively unnoticeable to the human eye.

However, using very small tiles such as 8×8 pixels is not practical when using wavelet or wavelet-like transforms in place of the DCT transform. Wavelet-like transforms have been shown to provide significantly better data compression than the DCT transform, and therefore using wavelet-like transforms would be desirable if the tiling effect can be avoided while using a moderate amount of working memory.

It would therefore be desirable to provide an image processing system and method that process images using a moderate amount of working memory, such as 8 to 20 KB, by transforming the image data using a wavelet-like transform with moderately sized tiles, such as tiles of 64×64, or 32×32, or 64×32 pixels, while at the same time avoiding the generation of undesirable tiling (tile border) effects.

A third aspect of the present invention is based on the observation that the optimal quantization level to be applied to wavelet coefficients not only varies from one transform subband to another, but also varies from one region of an image to another. In particular, regions of an image that contain many "features" (typically characterized by horizontal or vertical lines or edges) are harder to compress than regions with fewer features. That is, such densely featured image regions cannot be compressed as much as less densely featured regions without causing degradation in the quality of the image regions regenerated from the compressed data. It would therefore be desirable to provide an image compression and encoding system with a quantization procedure that uses smaller quantization divisors to quantize the wavelet coefficients of heavily featured regions than the quantization divisors used to quantize the wavelet coefficients of regions having fewer features.

SUMMARY OF THE INVENTION

In summary, the present invention is an image processing system and method for applying a family of predefined transforms, such as wavelet-like transforms, to the image data for an image so as to generate transform image data and for applying a data compression method to the transform image data so as to generation image file. The image processing system and method tiles a captured image, processing the tiles in a predefined order. The tiles are non-overlapping portions of the image data. Each tile of image data is processed by applying a predefined family of transform layers to the tile of image data so as to generate successive sets of transform coefficients. In a preferred embodiment, the transform layers are successive applications of a family of wavelet-like decomposition transforms, including edge filters applied to data at the boundaries of the data arrays being processed and interior filters applied to data in the interior regions of the data arrays.

The set of transform coefficients processed by each transform layer include edge coefficients positioned at outside boundaries of the set of transform coefficients and non-edge coefficients positioned at interior locations of the set of transform coefficients. The sets of transform coefficients include a last set of transform coefficients, produced by the last transform layer, and one or more earlier sets of transform coefficients.

The transform filters used include one or more edge transform filters applied to image data at boundaries of the tile and to coefficients positioned at and near boundaries of each of the earlier sets of transform coefficients so as to generate the edge coefficients, and one or more interior filters applied to image data at interior locations of the tile and to coefficients at interior locations of the earlier sets of transform coefficients so as to generate the non-edge coefficients. The edge transform filters have shorter filter supports than the interior transform filters, and both the edge transform filters and the longer interior transform filters are applied only to image data within the tile and only to transform coefficients within the earlier sets of transform.

The edge filters include a short, low spatial frequency filter that weights the image datum closest to the boundary of the tile and the transform coefficient closest to the boundary of each earlier set of transform coefficients so as to as enable regeneration of the image from the transform coefficients without tile boundary artifacts.

At least some of the transform filters are preferably asymmetric boundary filters, extending to a first extent toward each tile's boundary, and extending to a second, longer extent in a direction away from the tile's boundary, but not extending over the tile's boundary.

In a preferred embodiment, the interior transform filters include a center filter, for generating two to four high pass and two to four low pass coefficients at or near the center of the data array being processed. The center filter acts as a filter switch. Two distinct forms of the interior filter are used on alternate sides of the center filter. For instance, the interior filter may be centered on even data positions on one side of the center filter and centered on odd data positions on the other side of the center filter.

The image processing system and method may also include image reconstruction circuitry or procedures for successively applying a data decompression method and an inverse transform to the image file so as to generate a reconstructed image suitable for display on an image viewer.

In a second aspect of the present invention, the sets of transform coefficients correspond to spatial frequency subbands of the image. The subbands are grouped in accordance with the transform layer that generated them. For one or more respective groups of subbands, for each tile of the image, one or more parameters are generated whose value is indicative of the density of image features in the tile. Each tile of the image is classified into one of a predefined set of categories in accordance with the values of the one or more parameters. Based on the classification of the tile, a set of quantization factors for the tile are selected, and then the transform coefficients of the tile are scaled by the selected set of quantization factors to as to generate a set of quantized transform coefficients for the tile.

In a third aspect of the present invention the quantized transform coefficients are encoded. While the coefficients for each group of spatial frequency subbands are being encoded, a most significant set of bit planes of those coefficients are stored in a first bitstream and the remaining least significant set of bit planes of the coefficients are stored in a second bitstream. From another viewpoint, the portions of the encoded coefficients (for a group of subbands) whose value exceeds a predefined threshold are stored in a first bitstream while the remaining portion of the encoded coefficients are stored in a second bitstream. When reconstructing an image from the image file at a specified resolution level, only the bitstreams corresponding to the specified resolution level are decoded and used to reconstruct the image. For some resolution levels, one or more of the bitstreams not used will contain the least significant portions (i.e., bit planes) of subbands whose more significant portions are contained in the bitstreams used to reconstruct the image at that resolution level.

BRIEF DESCRIPTION OF THE DRAWINGS

Additional objects and features of the invention will be more readily apparent from the following detailed description and appended claims when taken in conjunction with the drawings, in which:

FIGS. 5A, 5B, 5C, 5D and 5E depict image storage data structures.

FIGS. 7A, 7B and 7C graphically depict a forward and inverse wavelet-like data transformation procedure.

FIG. 8 depicts the spatial frequency subbands of wavelet coefficients generated by applying multiple layers of a decomposition wavelet or wavelet-like transform to an array of image data.

DESCRIPTION OF THE PREFERRED EMBODIMENTS

In this document, the terms "wavelet" and "wavelet-like" are used interchangeably. Wavelet-like transforms generally have spatial frequence characteristics similar to those of conventional wavelet transforms, and are losslessly reversible, but have shorter filters that are more computationally efficient.

The present invention may be implemented in a variety of devices that process images, including a variety of computer systems, ranging from high end workstations and servers to low end client computers, as well as in application specific dedicated devices, such as digital cameras.

System for Encoding and Distributing Multi-Resolution Images

Figure 1:
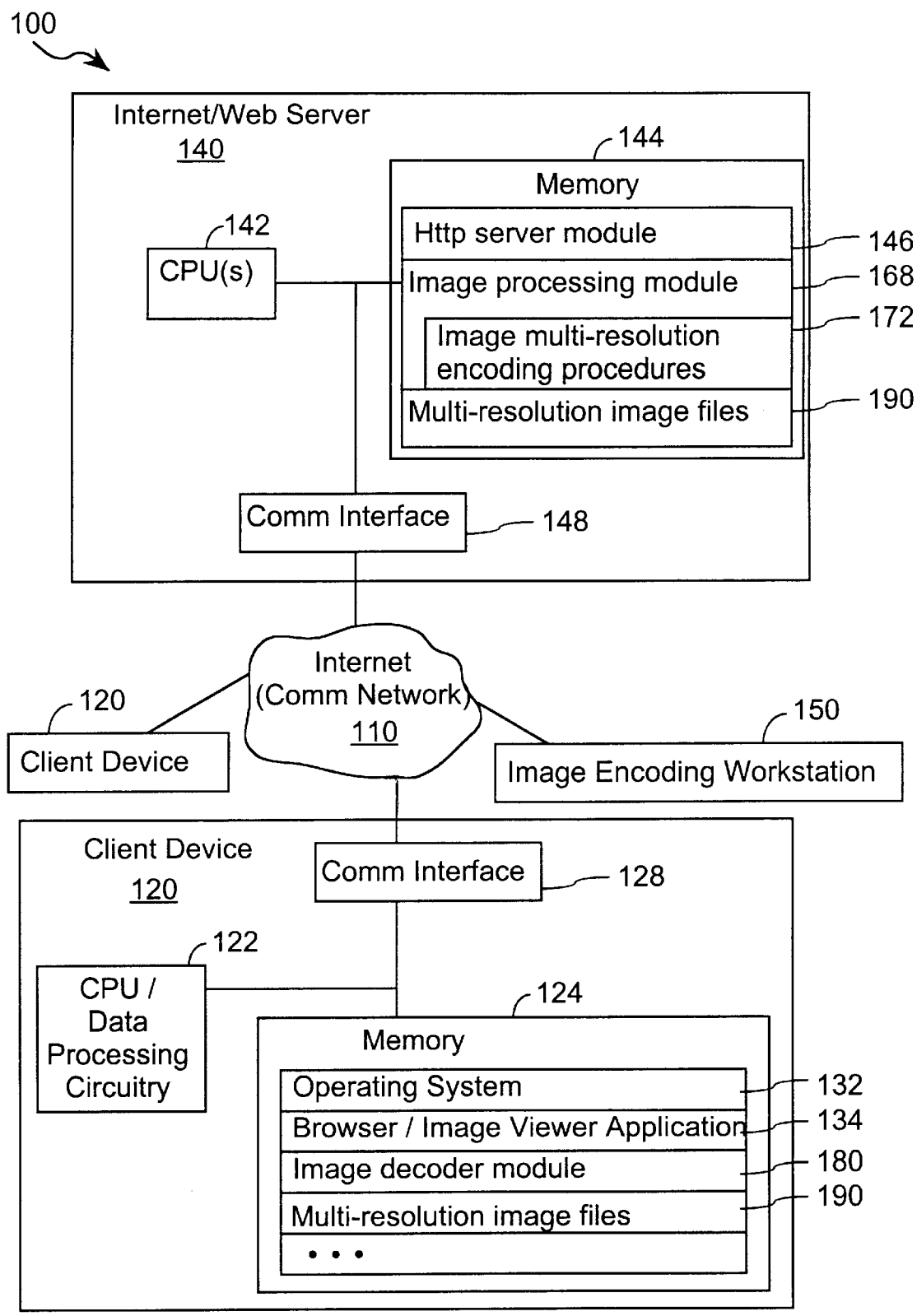
FIG. 1 is a block diagram of a distributed computer system, including a web server and a number of client computers, for distributing multi-resolution images to the client computers.

FIG. 1 shows a distributed computer system, including a web server 140 and a number of client computers 120, for distributing multi-resolution images 190 to the client computers via a global communications network 110, such as the Internet, or any other appropriate communications network, such as a local area network or Intranet. An imaging encoding workstation 150 prepares multi-resolution image files for distribution by the web server. In some embodiments, the web server 140 may also perform the image encoding tasks of the image encoding workstation 150.

A typical client device 120 will be a personal digital assistant, personal computer, workstation, or a computer controlled device dedicated to a particular task. The client device 120 will preferably include a central processing unit 122, memory 124 (including high speed random access memory, and non-volatile memory such as disk storage), and a network interface or other communications interface 128 for connecting the client device to the web server via the communications network 110. The memory 124 will typically store an operating system 132, a browser application or other image viewing application 134, an image decoder module 180, and multi-resolution image files 190 encoded in accordance with the present invention. In a preferred embodiment, the browser application 134 includes or is coupled to a Java™ (trademark of Sun Microsystems, Inc.) virtual machine for executing Java language programs, and the image decoder module is implemented as a Java™ applet that is dynamically downloaded to the client device along with the image files 190, thereby enabling the browser to decode the image files for viewing.

The web server 140 will preferably include a central processing unit 142, memory 144 (including high speed random access memory, and non-volatile memory such as disk storage), and a network interface or other communications interface 148 for connecting the web server to client devices and to the image encoding workstation 150 via the communications network 110. The memory 144 will typically store an http server module 146 for responding to http requests, including request for multi-resolution image files 190.

The web server 140 may optionally include an image processing module 168 with encoding procedures 172 for encoding images as multi-resolution images.

Computer System

Figure 2:
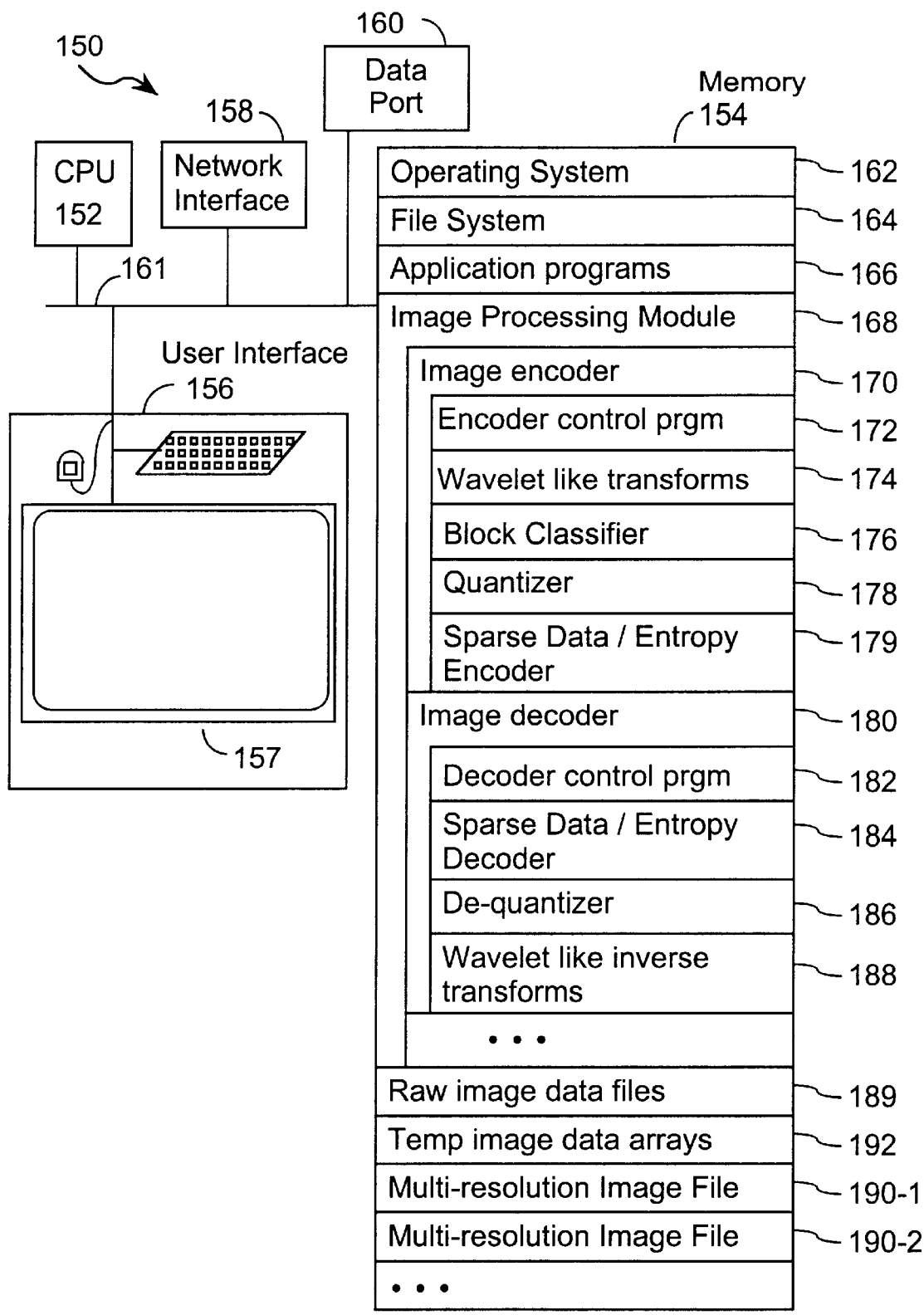
FIG. 2 is a block diagram of a computer system in accordance with an embodiment of the present invention.

Referring to FIG. 2, the image processing workstation 150 may be implemented using a programmed general-purpose computer system. This figure may also represent the web server, when the web server performs image processing tasks. The computer system 150 may include:

- one or more data processing units (CPU's) 152;
- memory 154, which will typically include both high speed random access memory as well as non-volatile memory;
- a user interface 156, including a display device 157 such as a CRT or LCD type display;
- a network or other communication interface 158 for communicating with other computers as well as other devices;
- a data port 160, such as for sending and receiving images to and from a digital camera (although such image transfers might also be accomplished via the network interface 158); and
- one or more communication busses 161 for interconnecting the CPU(s) 152, memory 154, user interface 156, network interface 158 and data port 160.

The computer system's memory 154 stores procedures and data, typically including:

- an operating system 162 for providing basic system services;
- a file system 164, which may be part of the operating system;
- application programs 166, such as user level programs for viewing and manipulating images,
- an image processing module 168, for performing various image processing functions including those that are the subject of the present document;

image files 190 representing various images; and temporary image data arrays 192 for intermediate results generated during image processing and image regeneration.

The computer 150 may also include a http server module 146 (FIG. 1) when this computer 150 is used both for image processing and distribution of multi-resolution images.

The image processing module 168 may include an image encoder module 170, and an image decoder module 180. The image encoder module 170 produces multi-resolution image files 190, the details of which will be discussed below. The image encoder module 170 may include:

an encoder control program 172, which controls the process of compressing and encoding an image (starting with a raw image array 189, which in turn may be derived from the decoding of an image in another image file format);

a set of wavelet-like transform procedures 174 for applying wavelet-like filters to image data representing an image;

a block classifier procedure 176 for determining the quantization divisors to be applied to each block (or band) of transform coefficients for an image;

a quantizer procedure 178 for quantizing the transform coefficients for an image; and a sparse data encoding procedure 179, also known as an entropy encoding procedure, for encoding the quantized transform coefficients generated by the quantizer 178.

The procedures in the image processing module 168 store partially transformed images and other temporary data in a set of temporary data arrays 192.

The image decoder module 180 may include:

a decoder control program 182 for controlling the process of decoding an image file (or portions of the image file) and regenerating the image represented by the data in the image file;

a sparse data decoding procedure 184 for decoding the encoded, quantized transform coefficients stored in an image file into a corresponding array of quantized. transform coefficients;

a de-quantizer procedure 186 for dequantizing a set of transform coefficients representing a tile of an image; and a set of wavelet-like inverse transform procedures 188 for applying wavelet-like inverse filters to a set of dequantized transform coefficients, representing a tile of an image, so as to regenerate that tile of the image.

Overview of Image Capture and Processing

Figure 3A:
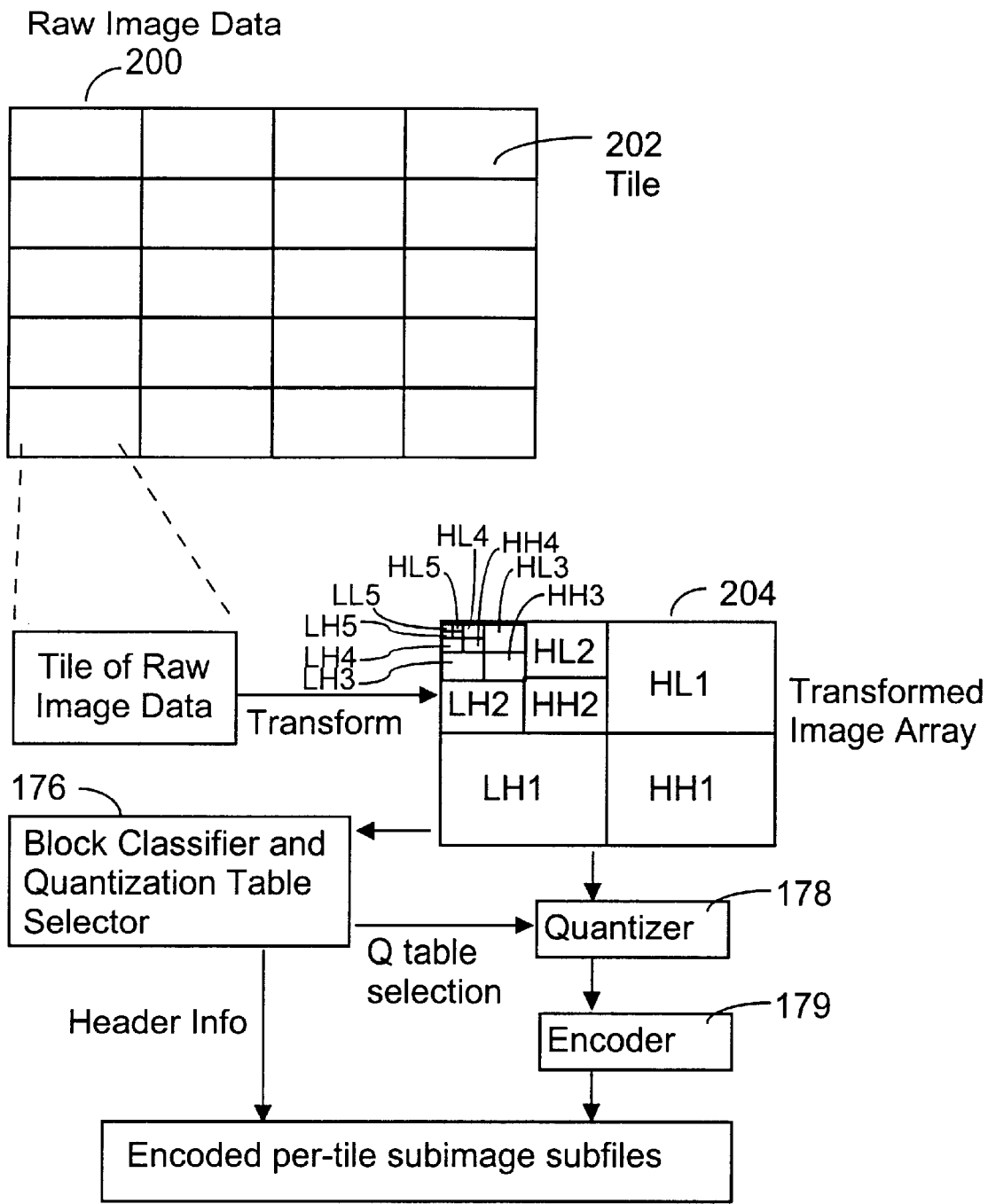
FIG. 3A schematically depicts the process of transforming a raw image into a transform image array and compressing the transform image array into a compressed image file.

Referring to FIG. 3, raw image data 200, obtained from a digital camera's image capture mechanism (FIG. 14) or from an image scanner or other device, is processed by "tiling the image data." More specifically, the raw image is treated as an array of tiles 202, each tile having a predefined size such as 64×64 (i.e., 64 rows by 64 columns). In other embodiments, other tile sizes, such as 32×32 or 16×32 or 128×128 or 64×128 may be used. The tiles are nonoverlapping portions of the image data. A sufficient number of tiles are used to cover the entire raw image that is to be processed, even if some of the tiles overhang the edges of the raw image. The overhanging portions of the tiles are filled with copies of boundary data values during the wavelet transform process, or alternately are filled with null data. Tile positions are specified with respect to an origin at the upper left corner of the image, with the first coordinate indicating the Y position of the tile (or a pixel or coefficient within the tile) and the second coordinate indicating the X position of the tile (or a pixel or coefficient within the tile). Thus a tile at position 0,128 is located at the top of the image, and has its origin at the $128^{th}$ pixel of the top row of pixels.

A wavelet or wavelet-like decomposition transform is successively applied to each tile of the image to convert the raw image data in the tile into a set of transform coefficients. When the wavelet-like decomposition transform is a one dimensional transform that is being applied to a two dimensional array of image data, the transform is applied to the image data first in one direction (e.g., the horizontal direction) to produce an intermediate set of coefficients, and then the transform is applied in the other direction (e.g., the vertical direction) to the intermediate set of coefficients so as to produce a final set of coefficients. The final set of coefficients are the result of applying the wavelet-like decomposition transform to the image data in both the horizontal and vertical dimensions.

The tiles are processed in a predetermined raster scan order. For example, the tiles in a top row are processed going from one end (e.g., the left end) to the opposite end (e.g., the right end), before processing the next row of tiles immediately below it, and continuing until the bottom row of tiles of the raw image data has been processed.

The transform coefficients for each tile are generated by successive applications of a wavelet-like decomposition transform. A first application of the wavelet decomposition transform to an initial two dimensional array of raw image data generates four sets of coefficients, labeled LL, HL1, LH1 and HH1. Each succeeding application of the wavelet decomposition transform is applied only to the LL set of coefficients generated by the previous wavelet transformation step and generates four new sets of coefficients, labeled LL, HLx, LHx and HHx, where x represents the wavelet transform "layer" or iteration. After the last wavelet decomposition transform iteration only one LL set remains. The total number of coefficients generated is equal to the number of data samples in the original data array. The different sets of coefficients generated by each transform iteration are sometimes called layers. The number of wavelet transform layers generated for an image is typically a function of the resolution of the initial image. For tiles of size 64×64, or 32×32, performing five wavelet transformation layers is typical, producing 16 spatial frequency subbands of data: $LL_5, HL_5, LH_5, HH_5, HL_4, LH_4, HH_4, HL_3, LH_3, HH_3, HL_2, LH_2, HH_2, HL_1, LH_1, HH_1$. The number of transform layers may vary from one implementation to another, depending on both the size of the tiles used and the amount of computational resources available. For larger tiles, additional transform layers would likely be used, thereby creating additional subbands of data. Performing more transform layers will often produce better data compression, at the cost of additional computation time, but may also produce additional tile edge artifacts.

The spatial frequency subbands are grouped as follows. Subband group 0 corresponds to the LL subband, where N is the number of transform layers applied to the image (or image tile). Each other subband group i contains three subbands, $LH_i$, $HL_i$ and $HH_i$. As will be described in detail below, when the transform coefficients for a tile are encoded, the coefficients from each group of subbands are encoded separately from the coefficients of the other groups of subbands. In a preferred embodiment, a pair of bitstreams is generated to represent the coefficients in each group of subbands. One of the bitstreams represents the most significant bit planes of the coefficients in the group of subbands while the second bitstream represents the remaining, least significant bit planes of the coefficients for the group of subbands.

The wavelet coefficients produced by application of the wavelet-like transform are preferably quantized (by quantizer 178) by dividing the coefficients in each subband of the transformed tile by a respective quantization value (also called the quantization divisor). In the preferred embodiment, a separate quantization divisor is assigned to each subband. More particularly, as will be discussed in more detail below, a block classifier 176 generates one or more values representative of the density of features in each tile of the image, and based on those one or more values, a table of quantization divisors is selected for quantizing the coefficients in the various subbands of the tile.

The quantized coefficients produced by the quantizer 178 are encoded by a sparse data encoder 179 to produce a set of encoded subimage subfiles 210 for each tile of the image.

Details of the wavelet-like transforms used in a preferred embodiment are described in detail below. Circuitry for performing the wavelet-like transform of the preferred embodiment is very similar to the wavelet transform and data quantization methods described in U.S. Pat. No. 5,909,518, "System and Method for Performing Wavelet and Inverse Wavelet Like Transformations of Digital Data Using Only Add and Bit Shift Arithmetic Operations," which is hereby incorporated by reference as background information.

The sparse data encoding method of the preferred embodiment is called Nested Quadratic Splitting (NQS), and is described in detail below. This sparse data encoding method is an improved version of the NQS sparse data encoding method described in U.S. Pat. No. 5,949,911, entitled "System and Method for Scalable Coding of Sparse Data Sets," which is hereby incorporated by reference as background information.

Figure 3B:
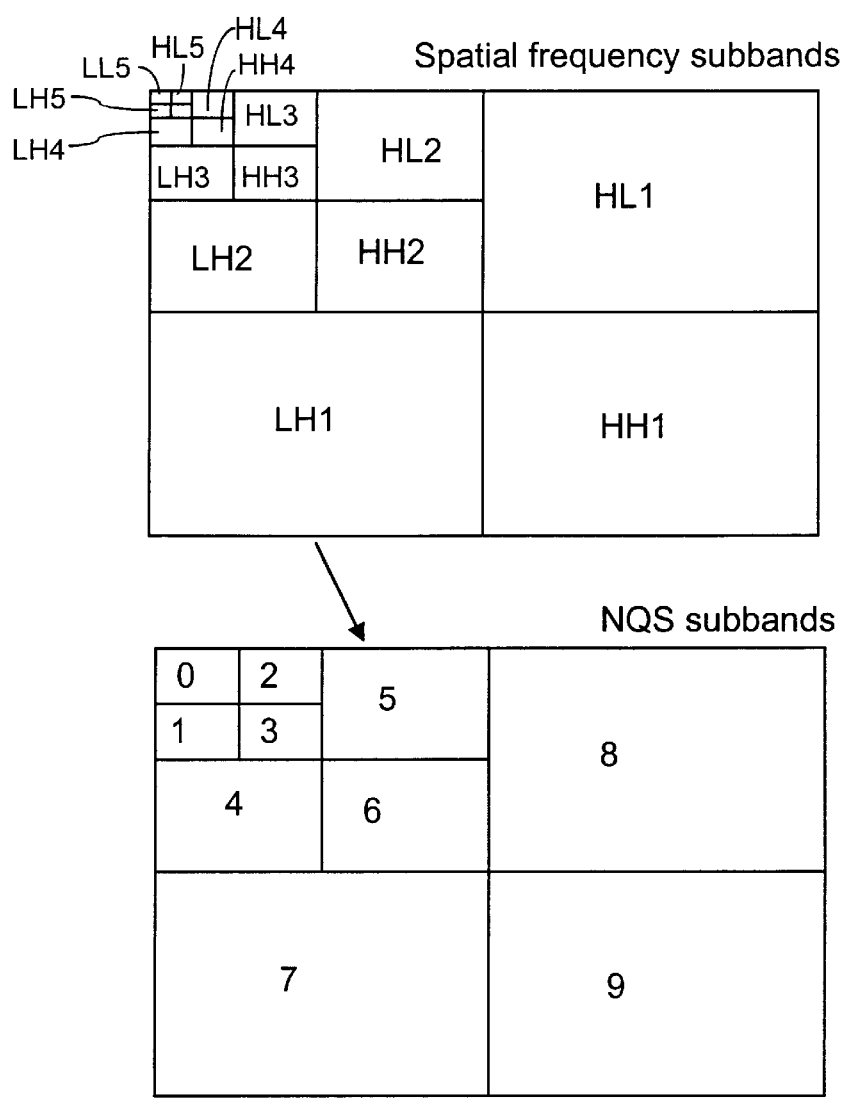
FIG. 3B depicts a mapping of spatial frequency subbands to NQS subbands used for encoding transform coefficients.

FIG. 3B depicts a mapping of spatial frequency subbands to NQS subbands used for encoding transform coefficients. In particular, in one preferred embodiment seven spatial frequency subbands ($LL_5$, $HL_5$, $LH_5$, $HH_5$, $HL_4$, $LH_4$, and $HH_4$) are mapped to a single NQS subband (subband 0) for purposes of encoding the coefficients in these subbands. In other words, the coefficients in these seven spatial frequency subbands are treated as a single top level block for purposes of NQS encoding. In one preferred embodiment, NQS subbands 0, 1, 2 and 3 are encoded as four top level NQS blocks, the most significant bit planes of which are stored in a bitstream representing a lowest resolution level of the image in question.

Image Resolution Levels and Subimages

Figure 4:
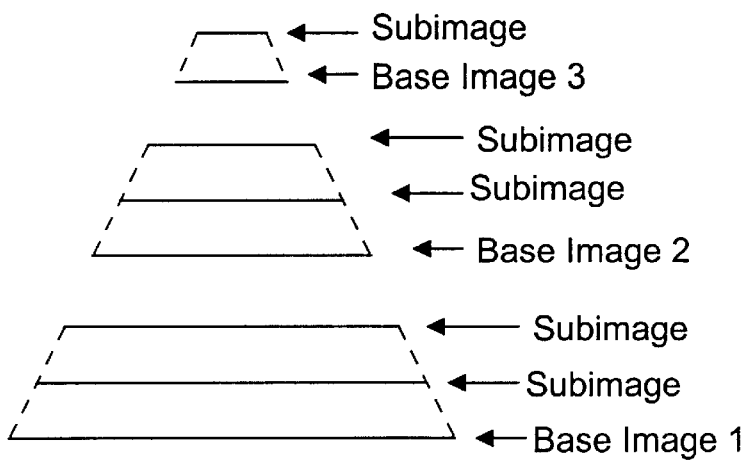
FIG. 4 is a conceptual representation of the encoded data that represents an image, organized to facilitate multi-resolution regeneration of the image (i.e., at multiple resolution levels).

Referring to FIG. 4, an image is stored at a number of resolution levels 0 to N, typically with each resolution level differing from its neighbors by a resolution factor of four. In other words, if the highest resolution representation (at resolution level N) of the image contains X amount of information, the second highest resolution level representation N−1 contains X/4 amount of information, the third highest resolution level representation contains X/16 amount of information, and so on. The number of resolution levels stored in an image file will depend on the size of the highest resolution representation of the image and the minimum acceptable resolution for the thumbnail image at the lowest resolution level. For instance, if the full or highest resolution image is a high definition picture having about 16 million pixels (e.g., a 4096×4096 pixel image), it might be appropriate to have seven resolution levels: 4096×4096, 2048×2048, 1024×1024, 512×512, 256×256, 128×128, and 64×64.

However, as shown in FIG. 4, one feature or aspect of the present invention is that when a multi-resolution image has more than, say, three or four resolution levels, the image is encoded and stored in multiple "base image" files, each of which contains the data for two to four of the resolution levels. Alternately, all the base images may be stored in a single file, with each base image being stored in a distinct base image subfile or subfile data structure within the image file.

Each base image file (or subfile) contains the data for reconstructing a "base image" and one to three subimages (lower resolution levels). For instance, in the example shown in FIG. 4, the image is stored in three files, with a first file storing the image at three resolution levels, including the highest definition level and two lower levels, a second file stores the image at three more resolution levels (the fourth, fifth and sixth highest resolution levels) and a third file stores the image at the two lowest resolution levels, for a total of eight resolution levels. Generally, each successive file will be smaller than the next larger file by a factor of about $2^{2X}$ where X is the number of resolution levels in the larger file. For instance, if the first file has three resolution levels, the next file will typically be smaller by a factor of 64 ($2^6$).

As a result, an image file representing a group of lower resolution levels will be much smaller, and thus much faster to transmit to a client computer, than the image file containing the full resolution image data. For instance, a user of a client computer might initially review a set of thumbnail images, at a lowest resolution level (e.g., 32×32 or 64×64), requiring the client computer to review only the smallest of the three image files, which will typically contain about 0.024% as much data as the highest resolution image file. When the user requests to see the image at a higher resolution, the client computer may receive the second, somewhat larger image file, containing about 64 times as much data as the lowest resolution image file. This second file may contain three resolution levels (e.g., 512×512, 256×256, and 128×128), which may be sufficient for the user's needs. In the event the user needs even high resolution levels, the highest resolution file will be sent. Depending on the context in which the system is used, the vendor of the images may charge additional fees for downloading each successively higher resolution image file.

It should be noted that many image files are not square, but rather are rectangular, and that the square image sizes used in the above examples are not intended to in any way limit the scope of the invention. While the basic unit of information that is processed by the image processing modules is a tile, which is typically a 64×64 or 32×32 array of pixels, any particular image may include an arbitrarily sized array of such tiles. Furthermore, the image need not be an even multiple of the tile size, since the edge tiles can be truncated wherever appropriate.

The designation of a particular resolution level of an image as the "thumbnail" image may depend on the client device to which the image is being sent. For instance, the thumbnail sent to a personal digital assistant or mobile telephone, which have very small displays, may be much smaller than (for example, one sixteenth the size of) the thumbnail that is sent to a personal computer; and the thumbnail sent to a device having a large, high definition screen may be much larger than the thumbnail sent to a personal computer having a display of ordinary size and definition. When an image is to be potentially used with a variety of client devices, additional base images are generated for the image so that each type of device can initially receive an appropriately sized thumbnail image.

When an image is first requested by a client device, the client device may specify its window size in its request for a thumbnail image, or the server may determine the size of the client device's viewing window by querying the client device prior to downloading the thumbnail image data to the client device. As a result, each client device receives an minimum resolution thumbnail that is appropriately sized for that device.

Image File Data Structures

Referring to FIGS. 5A through 5E, when all the tiles of an image have been transformed, compressed and encoded, the resulting encoded image data is stored as an image file 190. The image file 190 includes header data 194 and a sequence of base image data structures, sometimes called base image subfiles 196. Each base image subfile 196 typically includes the data for displaying the image at two or more resolution levels. Furthermore, each base image supports a distinct range of resolution levels. The multiple base images and their respective subimages together provide a full range of resolution levels for the image, as conceptually represented in FIG. 4. While the resolution levels supported by the base image levels are non-overlapping in the preferred embodiment, in an alternate embodiment the resolution levels supported by one base image may overlap with the resolution levels supported by another base image (for the same initial full resolution image).

In the preferred embodiment, each image file 190 is an html file or similarly formatted web page that contains a link 198, such as an object tag or applet tag, to an applet 199 (e.g., a Java™ applet) that is automatically invoked when the file is downloaded to a client computer. The header 194 and a selected one of the base images 196 are used as data input to the embedded applet 199, which decodes and renders the image on the display of user's personal digital assistant or computer. The operation of the applet is transparent to the user, who simply sees the image rendered on his/her computer display. Alternately, the applet may present the user with a menu of options including the resolution levels available with the base image subfile or subfiles included in the image file, additional base image subfiles that may be available from the server, as well as other options such as image cropping options. In an alternate embodiment, the client workstations include an application, such as a browser plug-in application, for decoding and rendering images in the file format of the present invention. Further, each image file 210 has an associated data type that corresponds to the plug-in application. The image file 210 is downloaded along with an html or similarly formatted web page that includes an embed tag or object tag that points to the image file. As a result, when the web page is downloaded to a client workstation, the plug-in application is automatically invoked and executed by the client computer's. As a result, the image file is decoded and rendered and the operation of the plug-in application is transparent to the user.

Figure 5A:
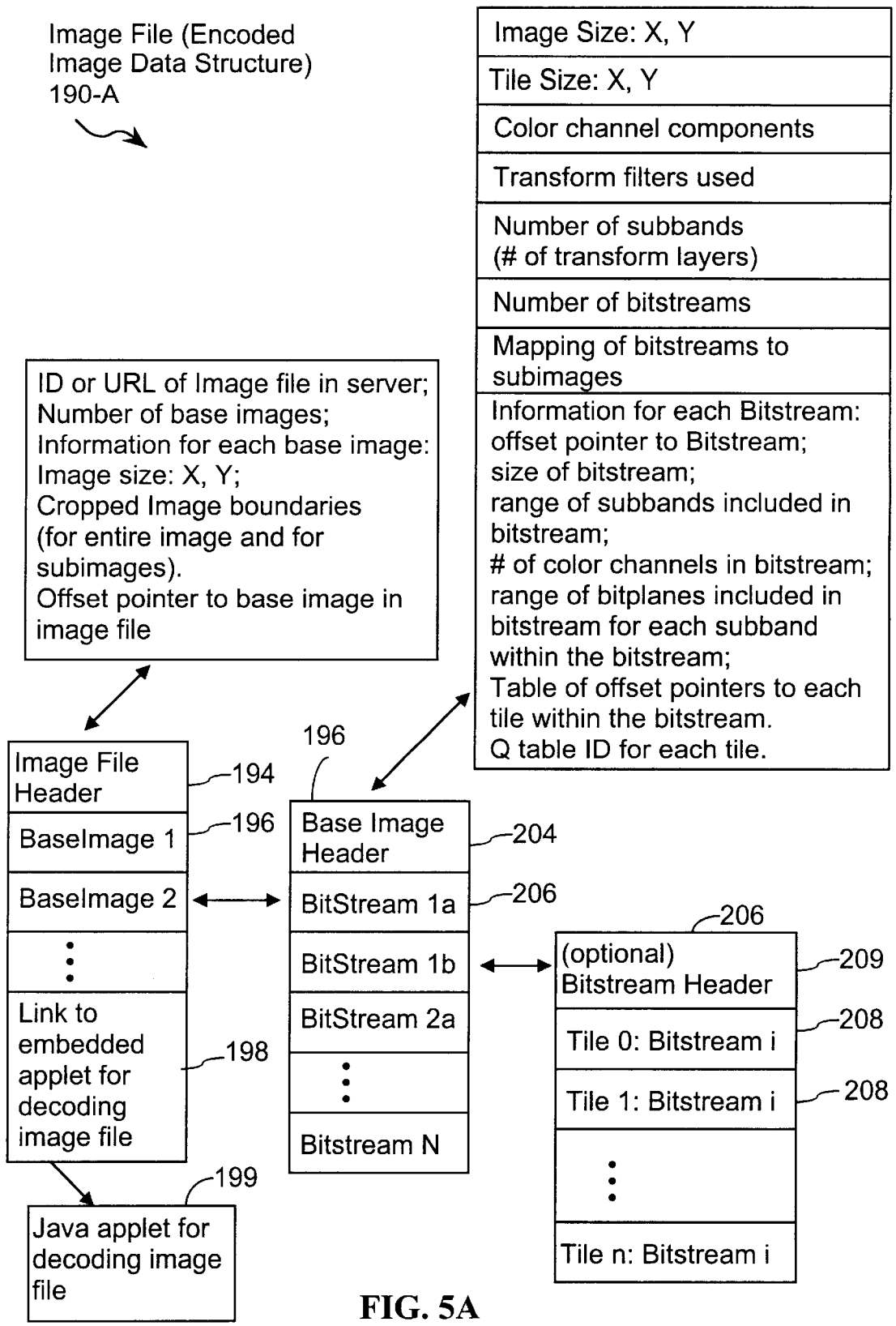
Figure 5B:
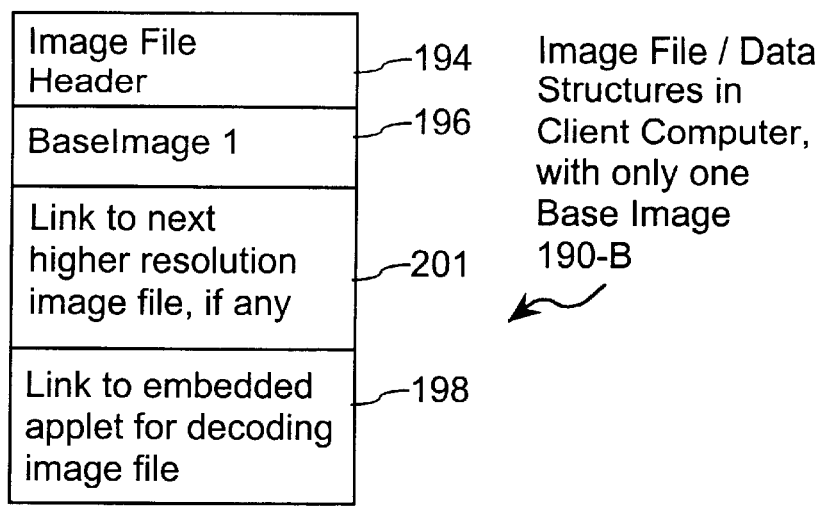

The image file 190-A shown in FIG. 5A represents one possible way of storing a multi-resolution image, and is particularly suitable for storing a multi-resolution image in a server. In a client computer, the image file 190-B as shown in FIG. 5B may contain only one base image 196. In addition, the client version of the image file 190 may contain a link 201 to the image file 190-A in the server. The link 201 is used to enable a user of the client computer to download other base images (at other resolution levels) of the same image. Alternately, the link 201 is a Java™ (trademark of Sun Microsystems) script for requesting an image file containing any of the higher resolution base images from the web server. If there is a charge for obtaining the higher resolution image file, the script will invoke the execution of the server procedure for obtaining payment from the requesting user.

In yet another alternate embodiment, a multi-resolution image may be stored in the server as a set of separate base image files 190-B, each having the format shown in FIG. 5B. This has the advantage of providing image files 190-B that are ready for downloading to client computers without modification.

Referring to FIG. 5A again, the header 194 of the image file includes the information needed to access the various base image subfiles 196. In particular, in a preferred embodiment the header 194 stores:

an identifier or the URL of the image file in the server;

a parameter value that indicates the number of base image subfiles 196 in the file (or the number of base image files in embodiments in which each base image is stored in a separate file);

the size of each base image data structure; and an offset pointer to each base image data structure (or a pointer to each base image file in embodiments in which each base image is stored in a separate file).

Each base image subfile 196 has a header 204 and a sequence of bitstreams 206. The bitstreams are labeled $1a$, $1b$, to N, where N is the number of resolution levels supported by the base image in question. The meaning of the labels "$1a$" and the like will be explained below. The information in each bit stream 206 will be described in full detail below. The header data 204 of each base image subfile includes fields that indicate:

the size of the base image subfile (i.e., the amount of storage occupied by the base image subfile);

the size of the tiles (e.g., the number of rows and columns of pixels) used to tile the base image, where each tile is separately transformed and encoded, as described below;

the color channel components stored for this base image subfile;

the transform filters used to decompose the base image (e.g., different sets of transform filters may be used on different images);

the number of spacial frequency subbands encoded for the base image (i.e., for each tile of the base image);

the number of resolution levels (also called subimages) supported by the base image;

the number of bitstreams encoded for the base image (i.e., for each tile of the base image); and information for each of the bitstreams.

The header information for each bitstream in the base image subfile may include:

an offset pointer to the bitstream to indicate its position within the image file (or within the base image subfile);

the size of bitstream (how much data is in the bitstream);

the range of spatial frequency subbands included in the bitstream;

the number of color channels in the bitstream;

the range of bit planes included in the bitstream, which indicates how the bit planes of the coefficients in the subbands were divided between significant, insignificant and possibly mid-significant portions; and a table of offset pointers to the tiles 208 within the bitstream.

Each bitstream 206 includes a sequence of tile subarrays 208, each of which contains the $i^{th}$ bitstream for a respective tile of the image. The bitstream 206 may optionally include a header 209 having fields used to override parameters specified for the base image by the base image header 204. When the image file contains a cropped image, the set of tile subarrays 208 included in the image file is limited to those needed to represent the cropped image.

In a preferred embodiment, the image file header 194 also includes parameters indicating "cropped image boundaries." This is useful for partial copies of the image file that contain data only for a cropped portion of the image, which in turn is very useful when a client computer is being used to perform pan and zoom operations on an image. For instance, a user may have requested only a very small portion of the overall image, but at very high resolution. In this case, only the tiles of the image needed to display the cropped portion of the image will be included in the version of the image file sent to the user's client computer, and the cropped image boundary parameters are used to convey this information to the procedures that render the image on the client computer. Two types of image cropping information are provided by the image file header 194: cropping that applies to the entire image file, and any further cropping that applies to specific subimages. For instance, when a client computer first receives an image, it may received just the lowest resolution level subimage of a particular base image, and that subimage will typically not be cropped (compared to the full image). When the client zooms in on a part of the image at a specified higher resolution level, only the tiles of data needed to generate the portion of the image to be viewed on the client computer are sent to the client computer, and thus new cropping parameters will be added to the header of the image file stored (or cached) in the client computer to indicate the cropping boundaries for the subimage level or levels downloaded to the client computer in response to the client's image zoom command.

Figure 15:
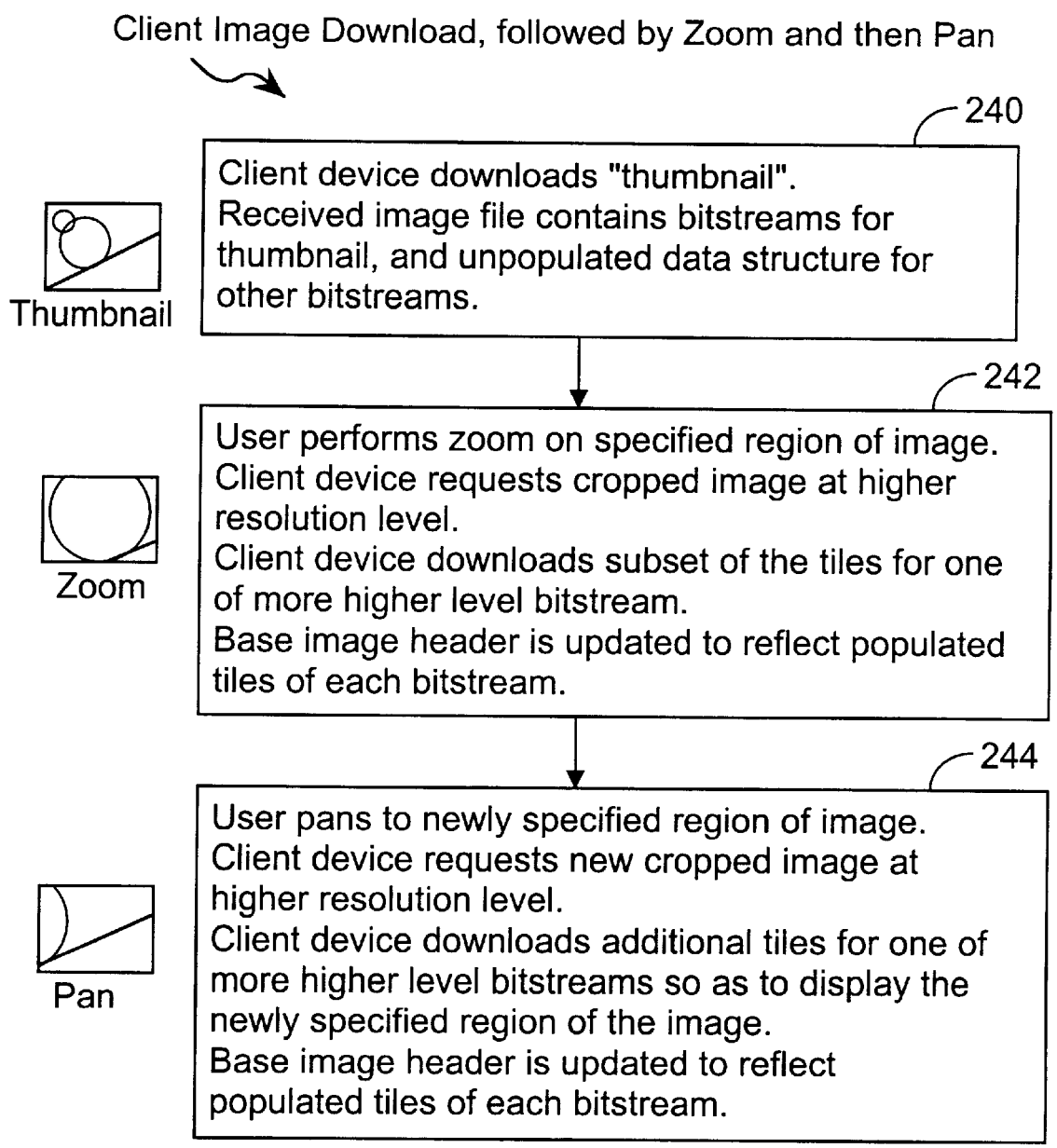
FIG. 15 is a conceptual flow chart of a client computer downloading a thumbnail image, then zooming in on the image, and then panning to a new part of the image.

The table of offset pointers to tiles that is included in the base image header for each bitstream in the base image is also used during zooming and panning. In particular, referring to FIG. 15, when an image file is first downloaded by a client computer or device (240), the higher level bitstreams may be unpopulated, and thus the table of offset pointers will initially contain null values. When the user of the client devices zooms in on the image, the data for various tiles of the higher level bitstreams are downloaded to the client device, as needed (242), and the table of offset pointers to tiles is updated to reflect the tiles for which data have been downloaded to the client computer. When the client further pans across the image at the zoomed or higher resolution level, additional tiles of information are sent to the client computer as needed, and the cropping information in the image file header 194 and the tile offset information in the base image header are again updated to reflect the tiles of data stored for each bitstream (244).

Referring again to FIGS. 5A–5E, the information in the headers of the image file and the base image subfiles enables quick indexing into any part of the file, which enables a computer or other device to locate the beginning or end of any portion of the image, at any resolution level, without having to decode the contents of any other portions of the image file 190. This is useful, for example, when truncating the image file 190 so as to generate a lower image quality version of the file, or a cropped image version of the file, such as for transmission over a communications network to another computer or device.

In some of the discussions that follow, the terms "subimage" and "differential subimage" will be used with respect to the bitstreams 206 as follows. Generally, any subimage of a base image will include all the bitstreams from bitstream 1a through a particular last bitstream, such as bitstream 3. This group of contiguous bitstreams constitute the data needed to reconstruct the image at a particular resolution level, herein called a subimage. A "differential subimage" consists of the additional bitstreams needed to increase the image resolution from one subimage level to the next. For instance, bitstreams 1c, 2b and 3 might together be called a differential subimage because these bitstreams contain the data needed to double the resolution of the subimage generated from bitstreams 1a through 2a.

Figure 5C:
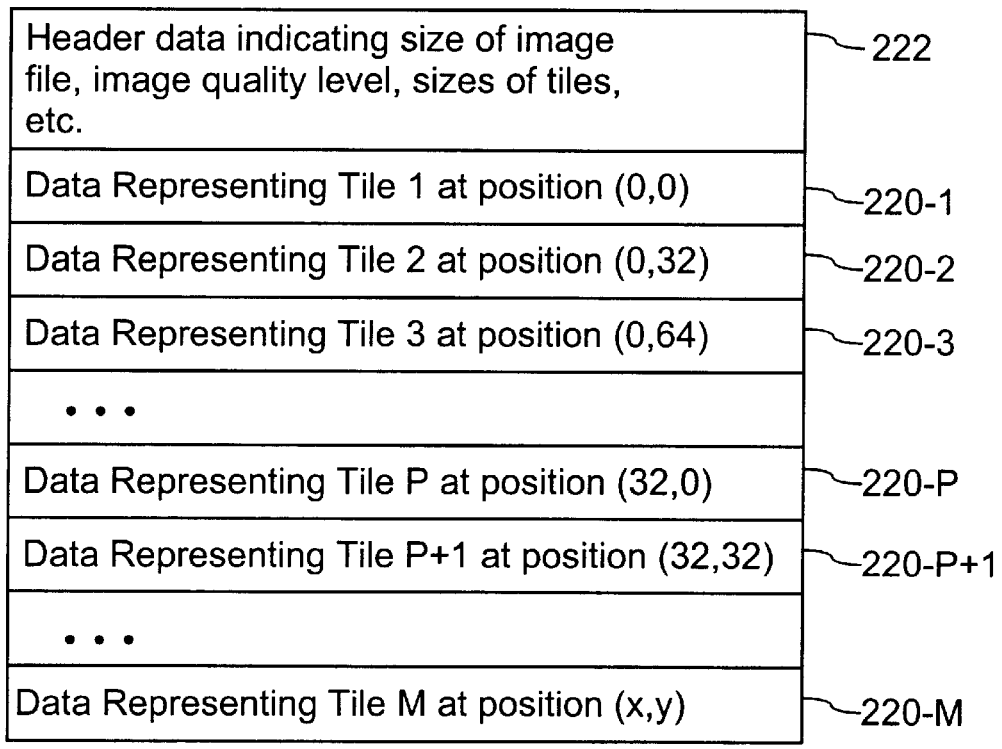

Referring to FIG. 5C, the encoded data 190-C representing a base image is initially stored in "tile order." The image file 190-C includes a header 222 and a set of tile subfiles 220. Referring to FIG. 5D, each tile subfile 220 contains a header 224 denoting the quantization table used to encode the tile, offset pointers to the bitstreams within the subfile, and other information. The tile subfile 220 for each tile also contains a set of bitstream subarrays 226. Each tile bitstream subarray 226 contains encoded data representing either the most significant bit planes, least significant bit planes or a middle set of bit planes of a respective set of NQS subbands (see FIG. 3B) of the tile. The following table shows an example of bit plan mappings to bitstream subarrays:

| NQS Subband Nos. Resolution | 0 to 3 | 4, 5, 6 | 7, 8, 9 |
|---|---|---|---|
| 16 × 16 | S | | |
| 32 × 32 | S + MS | S | |
| 64 × 64 | S + MS + IS | S + IS | All |

In this table, the bit planes corresponding to S, MS and IS differ for each NQS subband. These bit plane ranges are specified in the header of the base image subfile. For instance, for NQS subbands 0 to 3, S may corresponding to bit planes 16 to 7, MS may correspond to bit planes 6 to 4, and IS may correspond to bit planes 3 to 0; while for NQS subbands 4 to 6, S may corresponding to bit planes 16 to 5, and IS may correspond to bit planes 4 to 0.

Bitstreams 1a, 1b and 1c contain the encoded data representing the most significant, middle and least significant bit planes of NQS subbands 0, 1, 2 and 3, respectively. Bitstreams 2a and 2b contain the encoded data representing the most significant and least significant bit planes, respectively, of NQS subbands 4, 5 and 6, which correspond to the $LH_2$, $HL_2$ and $HH_2$ subbands. Bitstream 3 contains all the bit planes of the encoded data representing NQS subbands 7, 8 and 9, which correspond to the $LH_1$, $HL_1$, and $HH_1$, subbands, respectively.

The tile subfiles 220 may be considered to be "temporary" files, because the encoded tile data is later reorganized from the file format of FIGS. 5C and 5D into the file format shown in FIG. 5A.

Figure 5E:
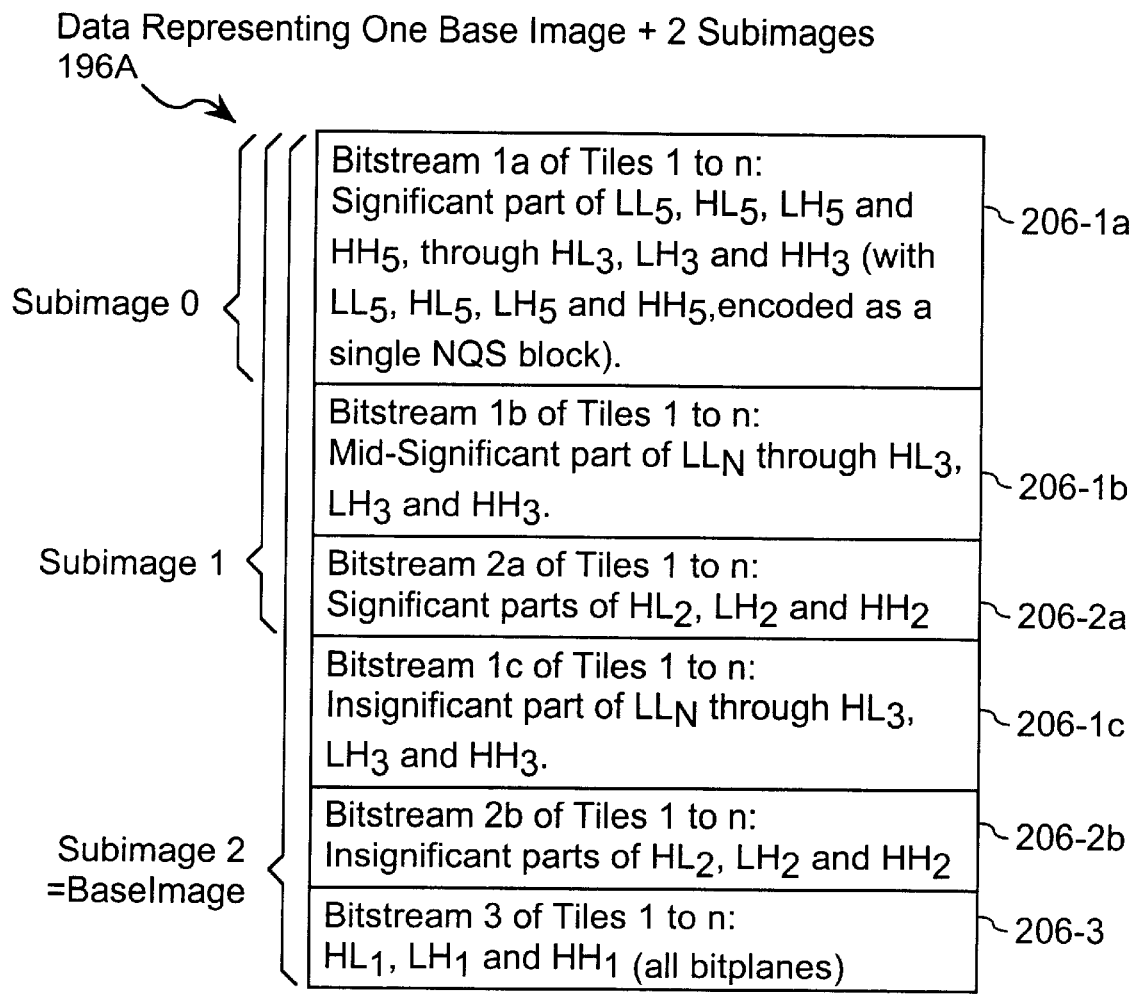

FIG. 5E shows a specific example of a base image subfile 196, labeled 196A. The base image subfile contains twelve bitstreams 206, which are used to generate the base image and two lower resolution subimages. The base image has been transformed with five layers of wavelet transforms, producing sixteen spatial frequency subbands of data, which have been encoded and organized into three subimages, including the base image. The number of subimages is somewhat arbitrary, since the subbands generated by five transform layers could be used to generate as many as six subimages. However, using this base image subfile to generate very small subimages is not efficient in terms of memory or storage utilization, and therefore it will often be preferred to use a smaller base image subfile to generate smaller subimages.

In FIG. 5E, the base image has been processed by five transform layers, but the resulting data has been organized into just three subimage levels instead of six. Effectively, the last three transform layers, which convert subband $LL_2$ into ten subbands ($LL_5$, $LH_5$, $HL_5$, $HH_5$, $LH_4$, $HL_4$, $HH_4$, $LH_3$, $HL_3$ and $HH_3$), are not used to generate an extra subimage level. Rather, the last three transform layers are used only to produce better data compression.

As shown in FIG. 5E, when the five transform layers of image data are mapped to three subimages, the mapping of bitstream data subarrays 206 to subimages is as follows:

subimage 0, the lowest level subimage, corresponds to bitstream subarray 206-1a, which contains the most significant bit planes of NQS subbands 0 to 3 (see FIG. 3B);

subimage 1 corresponds to bitstreams 206-1a, 206-1b and 206-2a; and subimage 2, the base image, corresponds to all the bitstreams 206 in the base image subfile.

When the transform layers are mapped to more subimages (subimage levels) than in the example shown in FIG. 5E, the first bitstream 206-1a will include fewer of the spatial frequency subbands.

A sparse data encoding technique is used to encode the transform coefficients for each group of subbands of each tile so that it takes very little data to represent arrays of data that contain mostly zero values. Typically, higher frequency portions (i.e., subbands) of the transformed, quantized image data will contain more zero values than non-zero values, and further most of the non-zero values will have relatively small absolute value. Therefore, the higher level bit planes of many tiles will be populated with very few non-zero bit values.

Tiled Wavelet Transform Method

Figure 6:
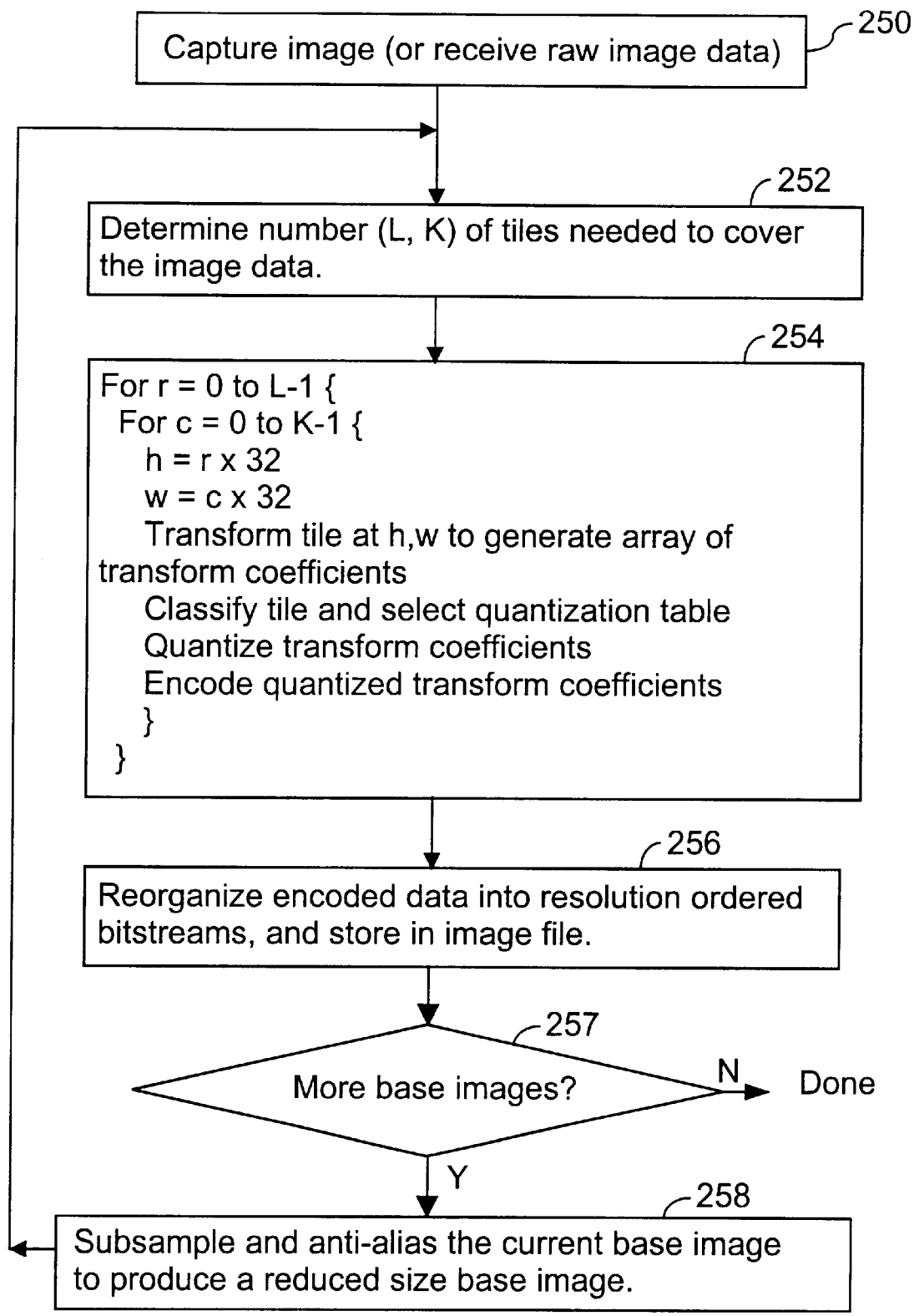
FIG. 6 is a high level flow chart of an image processing process to which the present invention can be applied.

Referring to FIG. 6, the process for generating an image file begins when an image is captured by the image capture device (step 250). If the image size is variable, the size of the captured image is determined and the number of rows and columns of tiles needed to cover the image data is determined (step 252). If the image size is always the same, step 252 is not needed.

Next, all the tiles in the image are processed in a predetermined order, for example in raster scan order, by applying a wavelet-like decomposition transform to them in both the horizontal and vertical directions, then quantizing the resulting transform coefficients, and finally by encoding the quantized transform coefficients using a sparse data compression and encoding procedure (step 254). The encoded data for each tile is stored in a temporary file or subfile, such as in the format shown in FIG. 5D.

After all the tiles in the image have been processed, a multi-resolution image file containing all the encoded tiles is stored in non-volatile memory (step 256). More specifically, the encoded tile data from the temporary files is written into an output bitstream file in resolution reversed order, in the file format shown in FIG. 5A. "Resolution reversed order" means that the image data is stored in the file with the lowest resolution bitstream first, followed by the next lowest resolution bitstream, and so on.

The wavelet-like decomposition transform used in step 254 is described in more detail below, with reference to FIGS. 7A, 7B and 7C. The quantization and sparse data encoding steps are also described in detail below.

After the initial image has been processed, encoded and stored as a multi-resolution image file, typically containing two to four resolution levels, if more than one base image is to be included in the image file (257), the original image is down-sampled and anti-aliased so as to generate a new base image (258) that is smaller in each dimension by a factor of $2^X$ where X is the number of subimage levels in the previously generated multi-resolution image file. Thus, the new base image will be a factor of 4 smaller than the smallest, lowest-resolution subimage of the base image. The new base image is then processed in the same way as the previous base image so as to generate an additional, but much smaller, encoded multi-resolution base image that is added to the image file. If the original base image had sufficiently high resolution, a third base image may be formed by performing a second round of down-sampling and anti-aliasing, and a third encoded multi-resolution base image file may be stored in the image file. The last encoded base image may contain fewer subimage levels than the others, and in some embodiments may contain only a single resolution level, in which case that image file is effectively a thumbnail image file.

In an alternate embodiment each encoded base image is stored in a separate image file, and these image files are linked to each other either by information stored in the headers of the image files, or by html (or html-like) links.

In a preferred embodiment, the down-sampling filter is a one-dimensional FIR filter that is applied first to the rows of the image and then to the columns, or vice versa. For example, if the image is to be down-sampled by a factor of 4 in each dimension (for a factor of 16 reduction in resolution), the FIR filter may have the following filter coefficients:

Filter A=(−3 −3 −4 −4 10 10 29 29 29 29 10 10 −4 −4 −3 −3) 1/128.

This exemplary filter is applied to a set of 14 samples at a time to produce one down-sampled value, and is then shifted by four samples and is then applied again. This repeats until L/4 down-sampled values have been generated, where L is the number of initial samples (i.e., pixel values). At the edges of the image data array, reflected data is used for the filter coefficients that extend past the edge of the image data. For instance at the left (or top) edge of the array, the first six coefficients are applied to reflected data values, the four "29/128" coefficients are applied to the first four pixel values in the row (or column) being filtered, and the last six coefficients are applied to the next six pixels in the row (or column).

If an image is to be down-sampled by a factor of 8, the above described filter is applied to down-sample by a factor of 4, and then a second filter is applied to further down-sample the image data by another factor of 2. This second filter, in a preferred embodiment, is a FIR filter that has the following filter coefficients:

Filter B=(−3 −4 10 29 29 10 −4 −3) 1/64.

Alternately, a longer filter could be used to achieve the down-sampling by a factor of 8 in one filter pass.

The down-sampling filters described above have the following properties: they are low-pass filters with cut-off frequencies at one quarter and one half the Nyquist frequency, respectively; each filter coefficient is defined by a simple fraction in which the numerator is an integer and the denominator is a positive integer power of 2 (i.e., a number of the form $2^N$, where N is a positive integer). As a result of these filter properties, the down-sampling can be performed very efficiently while preserving the spatial frequency characteristics of the image and avoiding aliasing effects.

While the order in which the down-sampling filter(s) are applied to an array of image data (i.e., rows and then columns, or vice versa) will affect the specific down-sampled pixel values generated, the affect on the pixel values is not significant. Other down-sampling filters may be used in alternate embodiments of the invention.

Wavelet-Like Decomposition Using Edge, Interior and Center Transform Filters FIGS. 7A–7C schematically represent the process of performing a wavelet-like decomposition on a set of image data $X_0$ to $X_{2n-1}$ to generate a set of coefficients $L_0$ to $L_{n-1}$ and $H_0$ to $H_{n-1}$ where the L coefficients represent the low spatial frequency components of the image data and the H coefficients represent the high spatial frequency components of the image data.

In the preferred embodiment, the wavelet-like transform that is applied is actually two filters. A first filter, T1, called the edge filter, is used to generate the first two and last two coefficients in the row or column of transform coefficients that are being generated, and a second filter T2, called the interior filter, is used to generate all the other coefficients in the row or column of transform coefficients being generated. The edge filter, T1, is a short filter that is used to transform data at the edges of a tile or block, while the interior filter T2 is a longer filter that is used to transform the data away from the edges of the tile or block. Neither the edge filter nor the interior filter uses data from outside the tile or block. As a result, the working memory required to apply the wavelet-like transform of the present invention to an array of image data is reduced compared to prior art systems. Similarly, the complexity of the circuitry and/or software for implementing the wavelet-like transform of the present invention is reduced compared to prior art systems.

In the preferred embodiment, the edge filter includes a first, very short filter (whose "support" covers two to four data values) for generating the first and last coefficients, and a second filter for generating the second and second to last coefficients. The second edge filter has a filter support that extends over three to six data values, and thus is somewhat longer than the first edge filter but shorter than the interior filter T2. The interior filter for generating the other coefficients typically has a filter support of seven or more data values. The edge filter, especially the first edge filter for generating the first and last high spatial frequency coefficient values, is designed to minimize edge artifacts while not using any data from neighboring tiles or blocks, at a cost of decreased data compression. Stated in another way, the edge filter of the present invention is designed to ensure accurate reproduction of the edge values of the data array being processed, which in turn minimizes edge artifacts when the image represented by the data array is regenerated.

In the preferred embodiment, the wavelet-like decomposition transform applied to a data array includes a layer 1 wavelet-like transform that is distinct from the wavelet-like transform used when performing layers 2 to N of the transform. In particular, the layer 1 wavelet-like transform uses shorter filters, having shorter filter supports, than the filters used for layers 2 to N. One of the reasons for using a different wavelet-like transform (i.e., a set of transform filters) for layer 1 is to minimize boundary artifacts by using short filters for layer 1, which tend to minimize boundary artifacts. Another reason for using a different wavelet-like transform (i.e., a set of transform filters) for layer 1 than for the other layers is to minimize rounding errors introduced by the addition of a large number of scaled values. Rounding errors, which occur primarily when filtering the raw image data during the layer 1 transform, can sometimes cause noticeable degradation in the quality of the image regenerated from the encoded image data.

The equations for the wavelet-like decomposition transform used in the preferred embodiment are presented below.

Layer 1 Forward Wavelet-Like Transform

T1 and T2 Forward Transforms (Low Frequency):

$$Y_k = X_{2k} - X_{2k+1} \quad k=0, 1, \ldots, n-1$$

$$L_k = X_{2k+1} + \left[\frac{Y_k + 1}{2}\right] = \frac{X_{2k} + X_{2k+1} + 1}{2} \quad k=0, 1, \ldots, n-1$$

T1 Forward Transform (Edge Filter - High Frequency):

$$H_0 = Y_0 + \left[\frac{-L_0 + L_1 + 1}{2}\right]$$

$$H_1 = Y_1 + \left[\frac{-L_0 + L_2 + 2}{4}\right]$$

$$H_{n-2} = Y_{n-2} + \left[\frac{-L_{n-3} + L_{n-1} + 2}{4}\right]$$

$$H_{n-1} = Y_{n-1} + \left[\frac{-L_{n-2} + L_{n-1} + 1}{2}\right]$$

T2 Forward Transform (Interior Filter - High Frequency):

$$H_k = Y_k + \left[\frac{3L_{k-2} - 22L_{k-1} + 22L_{k+1} - 3L_{k+2} + 32}{64}\right]$$

$$k = 2, \ldots, n-3$$

Layer 1 Inverse Wavelet-Like Transform

T1 Inverse Transform (Edge Filter - High Frequency):

$$Y_0 = H_0 - \left[\frac{-L_0 + L_1 + 1}{2}\right]$$

$$Y_1 = H_1 - \left[\frac{-L_0 + L_2 + 2}{4}\right]$$

$$Y_{n-2} = H_{n-2} - \left[\frac{-L_{n-3} + L_{n-1} + 1}{4}\right]$$

$$Y_{n-1} = H_{n-1} - \left[\frac{-L_{n-2} + L_{n-1} + 1}{2}\right]$$

T2 Inverse Transform (Interior Filter):

$$Y_k = H_k - \left[\frac{3L_{k-2} - 22L_{k-1} + 22L_{k+1} - 3L_{k+2} + 32}{64}\right]$$

$$k = 2, \ldots, n-3$$

$$X_{2k+1} = L_k - \left[\frac{Y_k + 1}{2}\right] \quad k = 0, 1, \ldots, n-1$$

$$X_{2k} = Y_k + X_{2k+1} \quad k=0, 1, \ldots, n-1$$

Forward Wavelet-Like Transform: Layers 2 to N

The equations for the preferred embodiment of the forward wavelet-like decomposition transform for transform levels 2 through N (i.e., all except level 1) are shown next. Note that "2n" denotes the width of the data, as measured in data samples, that is being processed by the transform; "n" is assumed to be a positive integer. The edge filter T1 is represented by the equations for $H_0$, $H_{n-1}$, $L_0$, and $L_{n-1}$, and has a shorter filter support than the interior filter T2.

In an alternate embodiment, the same wavelet-like decomposition transforms are used for all layers. For example, the wavelet-like decomposition transform filters shown here for layers 2 to N would also be used for the layer 1 decomposition (i.e., for filtering the raw image data).

$$H_0 = X_1 - \left[\frac{X_0 + X_2 + 1}{2}\right] \text{ (edge filter)}$$

$$H_k = X_{2k+1} - \left[\frac{9(X_{2k} + X_{2k+2}) - X_{2k-2} - X_{2k+4} + 8}{16}\right]$$

$$k = 1, \ldots, \frac{n}{2} - 3$$

$$H_{\frac{n}{2}-2} = X_{n-3} - \left[\frac{X_{n-4} + X_{n-2} + 1}{2}\right] \text{ (center filter)}$$

$$H_{\frac{n}{2}-1} = X_{n-1} - \left[\frac{11X_{n-2} + 5X_{n+1} + 8}{16}\right] \text{ (center filter)}$$

$$H_{\frac{n}{2}} = X_n - \left[\frac{5X_{n-2} + 11X_{n+1} + 8}{16}\right] \text{ (center filter)}$$

$$H_{\frac{n}{2}+1} = X_{n+2} - \left[\frac{X_{n+1} + X_{n+3} + 1}{2}\right] \text{ (center filter)}$$

$$H_k = X_{2k} - \left[\frac{9(X_{2k-1} + X_{2k+1}) - X_{2k-3} - X_{2k+3} + 8}{16}\right]$$

$$k = \frac{n}{2} + 2, \ldots, n-2$$

$$H_{n-1} = X_{2n-2} - \left[\frac{X_{2n-3} + X_{2n-1} + 1}{2}\right] \text{ (edge filter)}$$

$$L_0 = X_0 + \left[\frac{H_0 + 2}{4}\right] = \frac{7X_0 + 2X_1 - X_2 + 3}{8} \text{ (edge filter)}$$

$$L_1 = X_2 + \left[\frac{H_0 + H_1 + 2}{4}\right] \text{ (edge filter)}$$

$$L_k = X_{2k} + \left[\frac{5(H_{k-1} + H_k) - H_{k-2} - H_{k+1} + 8}{16}\right]$$

$$k = 1, \ldots, \frac{n}{2} - 3$$

$$L_{\frac{n}{2}-2} = X_{n-4} + \left[\frac{H_{\frac{n}{2}-3} + H_{\frac{n}{2}-2} + 2}{4}\right] \text{ (center filter)}$$

$$L_{\frac{n}{2}-1} = X_{n-2} + \left[\frac{2H_{\frac{n}{2}-2} + 2H_{\frac{n}{2}-1} - H_{\frac{n}{2}} + 4}{8}\right] \text{ (center filter)}$$

$$L_{\frac{n}{2}} = X_{n+1} + \left[\frac{2H_{\frac{n}{2}+1} + 2H_{\frac{n}{2}} - H_{\frac{n}{2}-1} + 4}{8}\right] \text{ (center filter)}$$

$$L_{\frac{n}{2}+1} = X_{n+3} + \left[\frac{H_{\frac{n}{2}+1} + H_{\frac{n}{2}+2} + 2}{4}\right] \text{ (center filter)}$$

$$L_k = X_{2k+1} + \left[\frac{5(H_k + H_{k+1}) - H_{k-1} - H_{k+2} + 8}{16}\right]$$

$$k = \frac{n}{2} + 2, \ldots, n-3$$

$$L_{n-2} = X_{2n-3} + \left[\frac{H_{n-2} + H_{n-1} + 2}{4}\right] \text{ (edge filter)}$$

$$L_{n-1} = X_{2n-1} + \left[\frac{H_{n-1} + 2}{4}\right]$$

$$= \frac{7X_{2n-1} + 2X_{2n-2} - X_{2n-3} + 3}{8} \text{ (edge filter)}$$

The general form of the decomposition transform equations, shown above, applies only when n is at least ten. When n is less than ten, some of the equations for terms between the edge and middle terms are dropped because the number of coefficients to be generated is too few to require use of those equations. For instance, when n=8, the two equations for generating $L_k$ will be skipped.

Discussion of Attributes of Transform Filter

It is noted that the edge transform filter T1 for generating $L_0$ and $L_{n-1}$ has a filter support of just three input samples at the edge of the input data array, and is weighted so that 70% of the value of these coefficients is attributable to the edge value $X_0$ or $X_{2n-1}$ at the very boundary of the array of data being filtered. The heavy weighting of the edge input datum (i.e., the sample closest to the array boundary) enables the image to be reconstructed from the transform coefficients substantially without tile boundary artifacts, despite the fact that the edge and interior filters are applied only to data within the tile when generating the transform coefficients for the tile. The layer 1 edge transform filter T1 for generating $L_0$ and $L_{n-1}$ is weighted so that 50% of the value of these coefficients is attributable to the edge value $X_{2n-1}$ at the very boundary of the data array being filtered.

The interior transform filters in the preferred embodiment are not applied in a uniform manner across the interior of the data array being filtered. Furthermore, the interior filter includes a center filter for generating four high pass and four low pass coefficients at or near the center of the data array being filtered. In alternate embodiments the center filter may generate as few as two high pass and two low pass coefficients. The center filter is used to transition between the left and right (or upper and lower) portions of the interior filter. The transition between the two forms of the interior filter is herein called "filter switching." One half of the interior filter, excluding the center filter, is centered on even numbered data or coefficient positions while the other half of the interior filter is centered on data at odd data positions. (The even and odd data positions of the array are, of course, alternating data positions.) While the equations as written place the center filter at the middle of the array, the center filter can be positioned anywhere within the interior of the data array, so long as there is a smooth transition between the edge filter and the interior filter. Of course, the inverse transform filter must be defined so as to have an inverse center filter at the some position as the forward transform filter.

Transform Equations for Small Data Arrays, for Layers 2 to N

When n is equal to four, the transform to be performed can be represented as:

$(X_0, X_1, X_2, X_3, X_4, X_5, X_6, X_7) \rightarrow (L_0, L_1, L_2, L_3; H_0, H_1, H_2, H_3)$ and the above general set of transform equations is reduced to the following:

$$H_0 = X_1 - \left\lfloor \frac{X_0 + X_2 + 1}{2} \right\rfloor$$

$$H_1 = X_3 - \left\lfloor \frac{11X_2 + 5X_5 + 8}{16} \right\rfloor$$

$$H_2 = X_4 - \left\lfloor \frac{5X_2 + 11X_5 + 8}{16} \right\rfloor$$

$$H_3 = X_6 - \left\lfloor \frac{X_5 + X_7 + 1}{2} \right\rfloor$$

$$L_0 = X_0 + \left\lfloor \frac{H_0 + 2}{4} \right\rfloor$$

$$L_1 = X_2 + \left\lfloor \frac{2H_0 + 2H_1 - H_2 + 4}{8} \right\rfloor$$

$$L_2 = X_5 + \left\lfloor \frac{2H_3 + 2H_2 - H_1 + 4}{8} \right\rfloor$$

$$L_3 = X_7 + \left\lfloor \frac{H_3 + 2}{4} \right\rfloor$$

When n is equal to two, the transform to be performed can be represented as:

$(X_0, X_1, X_2, X_3) \rightarrow (L_0, L_1; H_0, H_1)$ and the above general set of transform equations is reduced to the following:

$$H_0 = X_1 - \left\lfloor \frac{X_0 + X_3 + 1}{2} \right\rfloor$$

$$H_1 = X_2 - \left\lfloor \frac{X_0 + X_3 + 1}{2} \right\rfloor$$

$$L_0 = X_0 + \left\lfloor \frac{H_0 + 2}{4} \right\rfloor$$

$$L_1 = X_3 + \left\lfloor \frac{H_1 + 2}{4} \right\rfloor$$

Inverse Wavelet-Like Transform: Layers 2 to N

The inverse wavelet-like transform for transform layers 2 through N (i.e., all except layer 1), used in the preferred embodiment, are shown next. The general form of the transform equations applies only when n is at least ten. When n is less than ten, some of the equations for terms between the edge and middle terms are dropped because the number of coefficients to be generated is too few to require use of those equations.

$$X_0 = L_0 - \left\lfloor \frac{H_0 + 2}{4} \right\rfloor$$

$$X_2 = L_1 - \left\lfloor \frac{H_0 + H_1 + 2}{4} \right\rfloor$$

$$X_{2k} = L_k - \left\lfloor \frac{5(H_{k-1} + H_k) - H_{k-2} - H_{k+1} + 8}{16} \right\rfloor$$

$$k = 2, \ldots, \frac{n}{2} - 3$$

$$X_{n-4} = L_{\frac{n}{2}-2} - \left\lfloor \frac{H_{\frac{n}{2}-3} + H_{\frac{n}{2}-2} + 2}{4} \right\rfloor$$

$$X_{2k+1} = L_k - \left\lfloor \frac{5(H_k + H_{k+1}) - H_{k-1} - H_{k+2} + 8}{16} \right\rfloor$$

$$k = \frac{n}{2} + 2, \ldots, n-3$$

$$X_{n-2} = L_{\frac{n}{2}-1} - \left\lfloor \frac{2H_{\frac{n}{2}-2} + 2H_{\frac{n}{2}-1} - H_{\frac{n}{2}} + 4}{8} \right\rfloor$$

$$X_{n+1} = L_{\frac{n}{2}} - \left\lfloor \frac{2H_{\frac{n}{2}+1} + 2H_{\frac{n}{2}} - H_{\frac{n}{2}-1} + 4}{8} \right\rfloor$$

$$X_{n+3} = L_{\frac{n}{2}+1} - \left\lfloor \frac{H_{\frac{n}{2}+1} + H_{\frac{n}{2}+2} + 2}{4} \right\rfloor$$

$$X_{2n-3} = L_{n-2} - \left\lfloor \frac{H_{n-2} + H_{n-1} + 2}{4} \right\rfloor$$

$$X_{2n-1} = L_{n-1} - \left\lfloor \frac{H_{n-1} + 2}{4} \right\rfloor$$

$$X_1 = H_0 + \left\lfloor \frac{X_0 + X_2 + 1}{2} \right\rfloor$$

$$X_{2k+1} = H_k + \left\lfloor \frac{9(X_{2k} + X_{2k+2}) - X_{2k-2} - X_{2k+4} + 8}{16} \right\rfloor$$

$$k = 1, \ldots, \frac{n}{2} - 3$$

$$X_{n-3} = H_{\frac{n}{2}-2} + \left\lfloor \frac{X_{n-4} + X_{n-2} + 1}{2} \right\rfloor$$

$$X_{n-1} = H_{\frac{n}{2}-1} + \left\lfloor \frac{11X_{n-2} + 5X_{n+1} + 8}{16} \right\rfloor$$

$$X_n = H_{\frac{n}{2}} + \left\lfloor \frac{5X_{n-2} + 11X_{n+1} + 8}{16} \right\rfloor$$

$$X_{n+2} = H_{\frac{n}{2}+1} + \left\lfloor \frac{X_{n+1} + X_{n+3} + 1}{2} \right\rfloor$$

$$X_{2k} = H_k + \left\lfloor \frac{9(X_{2k-1} + X_{2k+1}) - X_{2k-3} - X_{2k+3} + 8}{16} \right\rfloor$$

$$k = \frac{n}{2} + 2, \ldots, n-2$$

$$X_{2n-2} = H_{n-1} + \left\lfloor \frac{X_{2n-3} + X_{2n-1} + 1}{2} \right\rfloor$$

When n is equal to eight, the above general set of inverse transform equations is reduced to the following:

$$X_0 = L_0 - \left\lfloor \frac{H_0 + 2}{4} \right\rfloor$$

$$X_2 = L_1 - \left\lfloor \frac{H_0 + H_1 + 2}{4} \right\rfloor$$

$$X_4 = L_2 - \left\lfloor \frac{H_1 + H_2 + 2}{4} \right\rfloor$$

$$X_6 = L_3 - \left\lfloor \frac{2H_2 + 2H_3 - H_4 + 4}{8} \right\rfloor$$

$$X_9 = L_4 - \left\lfloor \frac{2H_5 + 2H_4 - H_3 + 4}{8} \right\rfloor$$

$$X_{11} = L_5 - \left\lfloor \frac{H_5 + H_6 + 2}{4} \right\rfloor$$

$$X_{13} = L_6 - \left\lfloor \frac{H_6 + H_7 + 2}{4} \right\rfloor$$

$$X_{15} = L_7 - \left\lfloor \frac{H_7 + 2}{4} \right\rfloor$$

$$X_1 = H_0 + \left\lfloor \frac{X_0 + X_2 + 1}{2} \right\rfloor$$

$$X_3 = H_1 + \left\lfloor \frac{9(X_2 + X_4) - X_0 - X_6 + 8}{16} \right\rfloor$$

$$X_5 = H_2 + \left\lfloor \frac{X_4 + X_6 + 1}{2} \right\rfloor$$

-continued $$X_7 = H_3 + \left\lceil \frac{11X_6 + 5X_9 + 8}{16} \right\rceil$$

$$X_8 = H_4 + \left\lceil \frac{5X_6 + 11X_9 + 8}{16} \right\rceil$$

$$X_{10} = H_5 + \left\lceil \frac{X_9 + X_{11} + 1}{2} \right\rceil$$

$$X_{12} = H_6 + \left\lceil \frac{9(X_{11} + X_{13}) - X_9 - X_{15} + 8}{16} \right\rceil$$

$$X_{14} = H_7 + \left\lceil \frac{X_{13} + X_{15} + 1}{2} \right\rceil$$

When n is equal to four, the inverse transform to be performed can be represented as:

$(L_0, L_1, L_2, L_3; H_0, H_1, H_2, H_3) \rightarrow (X_0, X_1, X_2, X_3, X_4, X_5, X_6, X_7)$ and the above general set of inverse transform equations is reduced to the following:

$$X_0 = L_0 - \left\lceil \frac{H_0 + 2}{4} \right\rceil$$

$$X_2 = L_1 - \left\lceil \frac{2H_0 + 2H_1 - H_2 + 4}{8} \right\rceil$$

$$X_5 = L_2 - \left\lceil \frac{2H_3 + 2H_2 - H_1 + 4}{8} \right\rceil$$

$$X_7 = L_3 - \left\lceil \frac{H_3 + 2}{4} \right\rceil$$

$$X_1 = H_0 + \left\lceil \frac{X_0 + X_2 + 1}{2} \right\rceil$$

$$X_3 = H_1 + \left\lceil \frac{11X_2 + 5X_5 + 8}{16} \right\rceil$$

$$X_4 = H_2 + \left\lceil \frac{5X_2 + 11X_5 + 8}{16} \right\rceil$$

$$X_6 = H_3 + \left\lceil \frac{X_5 + X_7 + 1}{2} \right\rceil$$

When n is equal to two, the inverse transform to be performed can be represented as:

$L_0, L_1; H_0, H_1 \rightarrow (X_0, X_1, X_2, X_3, X_4)$ and the above general set of inverse transform equations is reduced to the following:

$$X_0 = L_0 - \left\lceil \frac{H_0 + 2}{4} \right\rceil$$

$$X_3 = L_1 - \left\lceil \frac{H_1 + 2}{4} \right\rceil$$

$$X_1 = H_0 + \left\lceil \frac{X_0 + X_3 + 1}{2} \right\rceil$$

$$X_2 = H_1 + \left\lceil \frac{X_0 + X_3 + 1}{2} \right\rceil$$

In the preferred embodiment, during each layer of the inverse transform process the coefficients at the even positions (i.e., the $X_{2i}$ values) must be computed before the coefficients at the odd positions (i.e., the $X_{2i+1}$ values).

In an alternate embodiment, the short T1 decomposition transform is used to filter all data, not just the data at the edges. Using only the short T1 decomposition transform reduces computation time and complexity, but decreases the data compression achieved and thus results in larger image files. Using only the short transform also reduces the computation time to decode an image file that contains an image encoded using the present invention, because only the corresponding short T1 reconstruction transform is used during image reconstruction.

Adaptive Blockwise Quantization

Referring to FIG. 3, each wavelet coefficient produced by the wavelet-like decomposition transform is quantized:

$$\hat{x}_q = \text{sign}(x) \left\lfloor \left( \frac{|x|}{q} + \frac{3}{8} \right) \right\rfloor$$

where q is the quantization divisor, and is dequantized:

$\hat{x} = q\hat{x}_q.$

In accordance with the present invention, a quantization table is used to assign each subband of the wavelet coefficients a quantization divisor, and thus controls the compression quality. If five layers of wavelet transforms are performed for luminance values (and four layers for the chrominance values), there are 16 subbands in the decomposition for the luminance values:

$LL_5, HL_5, LH_5, HH_5, HL_4, LH_4, HH_4, HL_3, LH_3, HH_3,$
$HL_2, LH_2, HH_2, HL_1, LH_1, HH_1,$ and 13 subbands for the chrominance values:

$LL_4, HL_4, LH_4, HH_4, HL_3, LH_3, HH_3, HL_2, LH_2, HH_2,$
$HL_1, LH_1, HH_1.$

One possible quantization table for the luminance values is:

q=(16, 16, 16, 18, 18, 18, 24, 24, 24, 36, 46, 46, 93, 300, 300, 600)

and for the chrominance values:

q=(32, 50, 50, 100, 100, 100, 180, 200, 200, 400, 720, 720, 1440).

However, in a preferred embodiment, the quantization factor q is chosen adaptively for each distinct tile of the image, based on the density of image features in the tile. Referring to FIG. 8, we label the entries of subbands $LH_k$, $HL_k$ and $HH_k$ as $u_{ij}^{(k)}$, $v_{ij}^{(k)}$, and $w_{ij}^{(k)}$, respectively.

Figures 9, 11C:
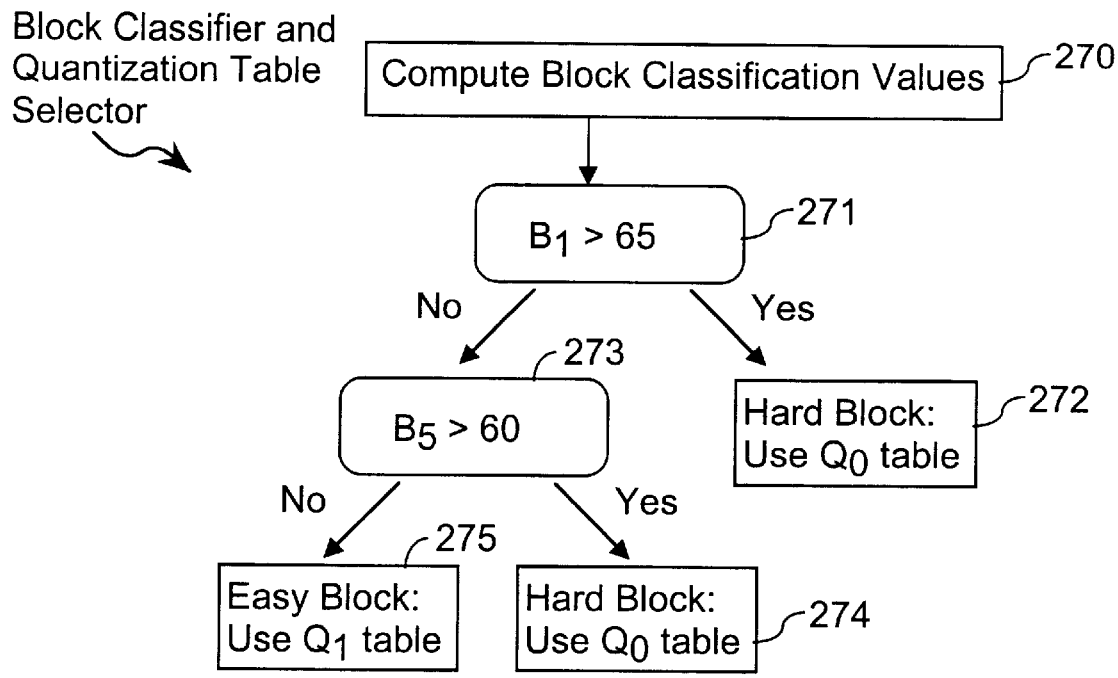
FIG. 9 depicts a flow chart of a block classification method for selecting a set of quantization divisors for a block of an image.
FIGS. 11A, 11B and 11C depict a method of encoding values, called MaxbitDepth values in a preferred embodiment, which represent the number of bits required to encode the transform coefficients in each block and subblock of an encoded image.

Referring to FIG. 9, the block classifier module computes for each transform layer (e.g., k=1, 2, 3, 4, 5) of the tile a set of block classification values, as follows:

$$U_k = \sum_{i,j} |u_{ij}^{(k)}|$$

$$V_k = \sum_{i,j} |v_{ij}^{(k)}|$$

$$W_k = \frac{1}{2} \sum_{i,j} |w_{ij}^{(k)}|$$

$$B_k = \max\{U_k, V_k, W_k\}$$

$$S_k = \sqrt{\frac{1}{2}\left\{U_k^2 + V_k^2 + W_k^2 - \frac{1}{3}(U_k + V_k + W_k)\right\}}$$

Vertical and horizontal lines in the original image will mostly be represented by $u_{ij}^{(k)}$ and $v_{ij}^{(k)}$, respectively. $B_k$ tends to be large if the original image (i.e., in the tile being evaluated by the block classifier) contains many features (e.g., edges and textures). Therefore, the larger the value of $B_k$, the harder it will be to compress the image without creating compression artifacts.

Using a two-class model, two quantization tables are provided:

$Q_0$=(16, 16, 16, 18, 18, 18, 36, 36, 36, 72, 72, 72 144, 300, 300, 600), $Q_1$=(16, 32, 32, 36, 36, 36, 72, 72, 72, 144, 144, 144, 288, 600, 600, 1200)

where $Q_0$ is used for "hard" to compress blocks and $Q_1$ is used for "easy" to compress blocks.

Interior tiles (i.e., tiles not on the boundary of the image) are each classified as either "hard" or "easy" to compress based on a comparison of one or more of the $B_k$ values with one or more respective threshold values. For instance, as shown in FIG. 9, $B_1$ for a tile may be compared with a first threshold TH1 (e.g., 65) (step 271). If $B_1$ is greater than the threshold, then the tile is classified as "hard" (step 272). Otherwise, $B_5$ is compared with a second threshold TH2 (e.g., 60) (step 273). If $B_5$ is greater than the second threshold, then the tile is classified as "hard" (step 274), and otherwise it is classified as "easy" (step 275). The wavelet coefficients for the tile are then quantized using the quantization divisors specified by the quantization table corresponding to the block (i.e., tile) classification.

In the preferred embodiment, boundary tiles are classified by comparing $B_1$ with another, high threshold value TH1B, such as 85. Boundary tiles with a $B_1$ value above this threshold are classified as "hard" to compress and otherwise are classified as "easy" to compress.

In an alternate embodiment, three or more block classifications may be designated, and a corresponding set of threshold values may be defined. Based on comparison of $B_1$ and/or other ones of the $B_1$ values with these thresholds, a tile is classified into one of the designated classifications, and a corresponding quantization table is then selected so as to determine the quantization values to be applied to the subbands within the tile. $S_k$ also tends to be large if the original image contains many features, and therefore in some embodiments $S_k$ is used instead of $B_k$ to classify image tiles.

Figure 10A:
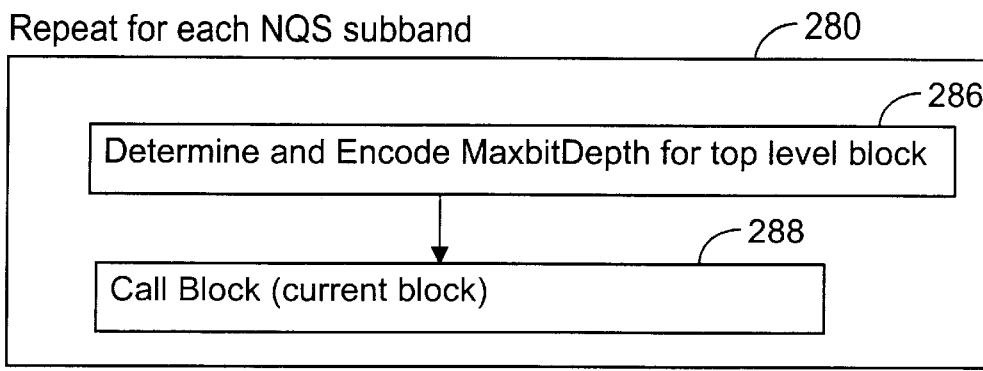
FIGS. 10A and 10B depict a flow chart of a procedure for encoding the transform coefficients for a block of an image.
Figure 10B:
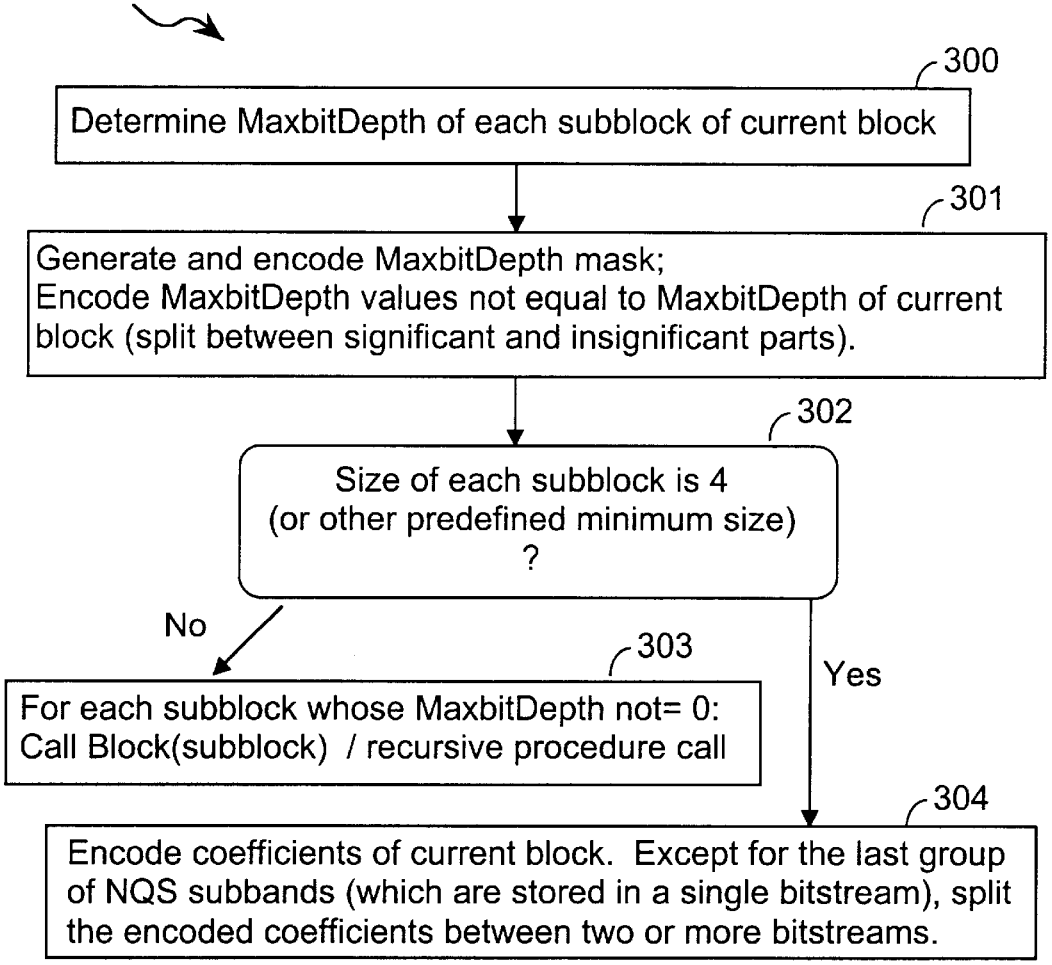

Sparse Data Encoding with Division between Significant and Insignificant Portions Referring to FIGS. 10A and 10B, once the transform coefficients for a tile of a base image have been generated and quantized, the next step is to encode the resulting coefficients of the tile. A group of computational steps 280 are repeated for each NQS subband. The bitstreams generated by encoding each NQS subband are divided by bit planes and then grouped together to form the bitstreams stored in the image files, as discussed above with respect to FIGS. 5A to 5E.

MaxbitDepth Mask

Referring to FIG. 10A, the encoding procedure or apparatus determines the maximum bit depth of the block of data in the NQS subband to be encoded (286), which is the maximum number of bits required to encode any of the coefficient values in the block, and is herein called the maximum bit depth, or MaxbitDepth. The value of MaxbitDepth is determined by computing the maximum number of bits required to encode the absolute value of any data value in the block. In particular, MaxbitDepth is equal to int (log2V)+1, where V is the largest absolute value of any element in the block, and "int( )" represents the integer portion of a specified value. The maximum bit depth for each top level block is stored in a corresponding bitstream (e.g., the significant bitstream for the subband group whose coefficients are being encoded). Next, the Block procedure is invoked for the current block (288). A pseudocode representation of the Block procedure is shown in Table 2.

Figure 11A:
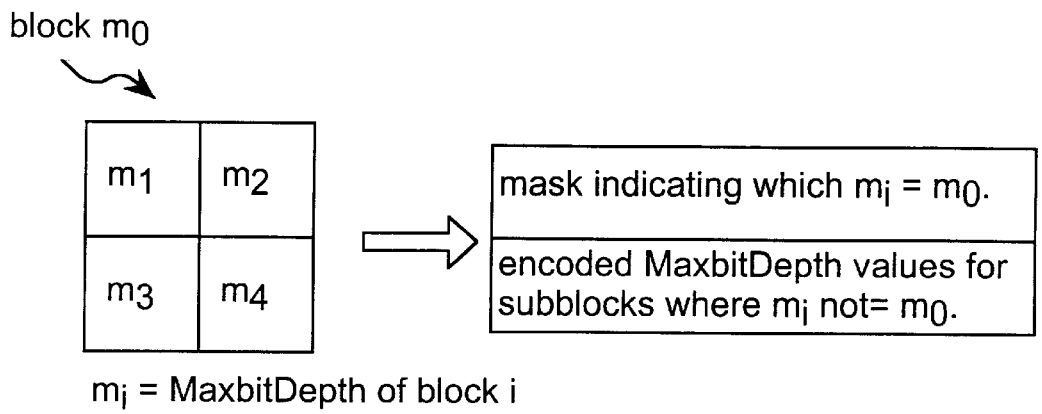

Each block contains four subblocks (see FIG. 11A). As shown in FIG. 10B, the Block procedure determines the MaxbitDepth for each of the four subblocks of the current block (300). Then, it generates and encodes a MaxbitDepth mask (301). The mask has four bits: $m_1, m_2, m_3$ and $m_4$, each of which is set equal to a predefined value (e.g., 1) only if the MaxbitDepth of the corresponding subblock is equal to the MaxbitDepth $m_0$ of the current (parent) block, and is otherwise set to zero. The mathematical representation of the mask is as follows:

$$\text{mask}=(m_0==m_1)+(m_0==m_2)+(M_0==m_3)+(M_0==m_4)$$

where the "+" in the above equation represents concatenation.

For example, a mask of 1000 indicates that only subblock 1 has a MaxbitDepth equal to the MaxbitDepth of the current block. The value of the mask is always between 1 and 15.

The MaxbitDepth mask is preferably encoded using a 15-symbol Huffmnan table (see Table 1). As can be seen, the four mask values that correspond to the most common mask patterns, where just one subblock having a MaxbitDepth equal to the MaxbitDepth of the parent block, are encoded with just three bits.

TABLE 1

Huffman Table for Encoding MaxbitDepth Mask

| Mask | Huffman Code |
| --- | --- |
| 0001 | 111 |
| 0010 | 101 |
| 0011 | 1001 |
| 0100 | 011 |
| 0101 | 0010 |
| 0110 | 10000 |
| 0111 | 01001 |
| 1000 | 110 |
| 1001 | 01000 |
| 1010 | 0001 |
| 1011 | 00110 |
| 1100 | 0101 |
| 1101 | 00111 |
| 1110 | 0000 |
| 1111 | 10001 |

Encoding Subblock MaxbitDepth Values

Figure 11B:
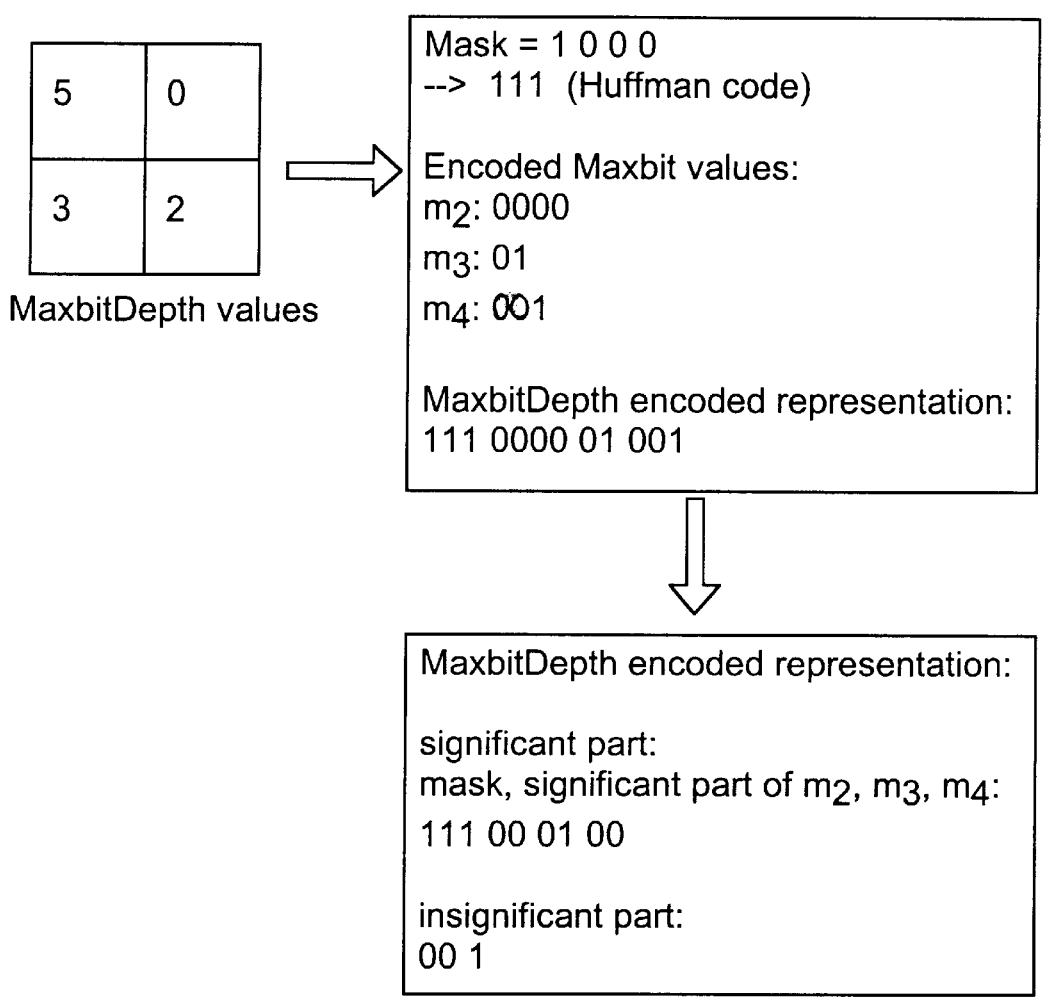

In addition, step 301 includes encoding the MaxbitDepth value for each of the subblocks whose MaxbitDepth is not equal to the MaxbitDepth $m_0$ of the current block. For instance, as shown in FIGS. 11A and 11B, if the MaxbitDepth values for the current block are $m_1, m_2, m_3, m_4$=5, 0, 3, 2 then the only MaxbitDepth values that need to be encoded are $m_2, m_3$ and $m_4$, because the MaxbitDepth value of $m_1$ is known from the MaxbitDepth mask and the previous stored and encoded value of the MaxbitDepth $m_0$ of the current block.

It should be noted that if $m_0$=1, then there is no need to encode the MaxbitDepth values of the subblocks, because those values are known completely from the MaxbitDepth mask.

If $m_0 \neq 1$, then for each $m_i \neq m_0$, the procedure encodes the value $m_i$ as follows:

$m_i$=0, then the procedure outputs a string of 0's of length $m_0$−1; and otherwise, the procedure outputs a string of 0's of length $m_0$−$m_i$−1 followed by a 1.

For instance, if $m_0$=5, and $m_1$=0, then $m_1$ is encoded as a string of four 0's: 0000. If $m_0$=5, and $m_2$=3, then $m_2$ is encoded as a string of (5−3−1=1) one 0 followed by a 1:01.

In our example of $\{m_1, m_2, m_3, M_4\} = \{5, 0, 3, 2\}$, the MaxbitDepth values are encoded as follows:

| mask | $m_2$ Subblock | $m_3$ Subblock | $m_4$ Subblock |
|---|---|---|---|
| 11 | 0000 | 01 | 001 |

Next, if the coefficients of the NQS subband being encoded are to be stored in two or more bitstreams, then the encoded representation of the MaxbitDepth values for the block is divided into two more portions, with each portion containing the information content for a certain range of bit planes. For ease of explanation, we will explain in detail how the MaxbitDepth values and mask and coefficient values are split between two portions, herein called the significant and insignificant portions. The same technique is used to split these values between three bit plane ranges corresponding significant, mid-significant and insignificant (or least significant) portions.

For each NQS subband, excluding the last group of NQS subbands, the coefficient bit planes are divided into two or three ranges. When there are two bit plane ranges, a bit plane threshold that divided the two ranges is chosen or predefined. The "insignificant" portion of each "coefficient value" (including its MaxbitDepth value) below the bit plane threshold is stored in an "insignificant" bitstream 206 (see FIG. 5D), and the rest of the coefficient is stored in the corresponding significant bitstream 206. Selection of the bit plane ranges is typically done on an experimental basis, but encoding numerous images using various bit plane ranges, and then selecting a set of bit plane ranges that on average achieves a specified division of data between the bitstreams for the various resolution levels. For example, the specified division may be an approximately equal division of data between the bitstream for a first resolution level and the next resolution level. Alternately, the specified division may call for the bitstreams for a second resolution level to contain four times as much data as the bitstreams for a first (lower) resolution level.

We will first address the splitting of MaxbitDepth values between significant and insignificant portions, and then we will address the encoding and splitting of coefficient values for minimum size blocks.

If the MaxbitDepth $m_0$ of a block is less than the threshold, the MaxbitDepth mask and every bit of the MaxbitDepth values for the subblocks are stored in the insignificant portion of the base image subfile. Otherwise, the MaxbitDepth mask is stored in the significant part, and then each of the encoded subblock MaxbitDepth values are split between significant and insignificant parts as follows. This splitting is handled as follows. If $m_i \geq$ threshold, the entire encoded MaxbitDepth value $m_i$ is included in the significant portion of the subimage subfile. Otherwise, the first $m_0$—threshold bits of each MaxbitDepth value $m_i$, excluding $m_i = m_0$, are stored in the significant portion of the subimage subfile and the remaining bits of each $m_i$ (if any) are stored in the insignificant portion of the subimage subfile.

If the bit planes of the coefficients are to be divided into three ranges, then two bit plane thresholds are chosen or predefined, and the MaxbitDepth mask and values are allocated among three bitstreams using the same technique as described above.

Encoding Coefficient Values for Minimum Size Block

Next, if the size of the current block (i.e., the number of coefficient values in the current block) is not a predefined minimum number (302-No), such as four, then the Block procedure is called for each of the four subblocks of the current block (303). This is a recursive procedure call. As a result of calling the Block procedure on a subblock, the MaxbitDepth mask and values for the subblock are encoded and inserted into the pair of bitstreams for the subband group being encoded. If the subblock is not of the predefined minimum size, then the Block procedure is recursively called on its subblocks, and so on.

When a block of the predefined minimum size is processed by the block procedure (302-Yes), after the MaxbitDepth mask for the block and the MaxbitDepth values of the subblocks have been encoded (301), the coefficients of the block are encoded, and the encoded values are split between significant and insignificant parts (304).

Each coefficient that is not equal to zero includes a POS/NEG bit to indicate its sign, as well as a MaxbitDepth number of additional bits. Further, the MSB (most significant bit) of each non-zero coefficient, other than the sign bit, is already known from the MaxbitDepth value for the coefficient, and in fact is known to be equal to 1. Therefore this MSB does not need to be encoded (or from another viewpoint, it has already been encoded with the MaxbitDepth value).

For each coefficient of a minimum size block, if the MaxbitDepth of the coefficient is less than the threshold, then all the bits of the coefficient, including its sign bit, are in the insignificant portion. Otherwise, the sign bit is in the significant portion, and furthermore the most significant bits (MSB's), if any, above the threshold number of least significant bits (LSB's), are also included in the significant portion. In other words, the bottom "threshold" number of bits are allocated to the insignificant portion. However, if the MaxbitDepth is equal to the threshold, the sign bit is nevertheless allocated to the significant portion and the remaining bits are allocated to the insignificant portion.

Furthermore, as noted above, since the MSB of the absolute value of each coefficient is already known from the MaxbitDepth mask and values, that bit is not stored. Also, coefficients with a value of zero are not encoded because their value is fully known from the MaxbitDepth value of the coefficient, which is zero.

For example (see FIG. 11C), consider four coefficients $\{31, 0, -5, -2\}$ of a block whose values are with binary values are POS 11111, 0, NEG 101, NEG 10, and a threshold value of 3. First the zero value coefficients and the MSB's of the non-zero coefficient are eliminated to yield: POS 1111, NEG 01, NEG 0. Then the threshold number of least significant bits (other than sign bits) are allocated to the insignificant portion and the rest are allocated to the significant portion as follows:

significant portion: POS 1, NEG insignificant portion: 111, 01, NEG 0.

The significant portion contains the most significant bits of the 31 and −5 coefficient values, while the insignificant portion contains the remaining bits of the 31 and −5 coefficient values and all the bits of the −2 coefficient value.

TABLE 2

Pseudocode for Block Encoding Procedure

```
// Encode MaxbitDepth m_i for each subblock i:
Determine MaxbitDepth m_i for each subblock i = 1, 2, 3, 4
mask = (m_0 == m_1) + (m_0 == m_2) + (m_0 == m_3) + (m_0 == m_4)
  // wher the "+" in the above equation represents concatenation
Encode and store mask using Huffman table
For i=1 to 4 {
    If m_i ≠ m_0 {
       if m_i = 0 {
         output a string of m_0 0's }
       else {    // m_i ≠ 0
         output a string of m_0–m_i 0's, followed by a 1 }
       }
    }
// Divide the encoded MaxbitDepth mask and MaxbitDepth between significant and
// insignificant portions as follows:
If m_0 < threshold {
    output the MaxbitDepth mask and MaxbitDepth values to insignificant bitstream }
else {
    output the MaxbitDepth mask to significant bitstream;
    for i = 1 to 4 {
       if m_i = m_0 {output nothing for that m_i }
       else {
         if m_i ≥ threshold { output m_i to significant bitstream }
         else {
            output the first m_0-threshold bits of m_i to the significant bitstream
            and output the remaining bits of m_i (if any) in the insignificant
            bitstream }
         }
       }
    }
// Encode Coefficient values if block is of minimum size
If size of current block is > minimum block size {
    // coefficient values are denoted as c_i
    for i = 1 to 4 {
       Call Block(subblock i);
       }
    else {    // size of current block is ≤ minimum block size
       C = number of coefficients in block; // if block size is already known, skip this step
       for i = 1 to C {
         if m_i < threshold {
            output all bits of c_i to insignificant bitstream;
            }
         else {
            output sign(c_i) to the significant bitstream;
            if m_i > threshold {
              #M = m_i – threshold –1;  // #M ≥ 0
              output the #M most significant bits to the significant bitstream;
              }
            output all remaining least significant bits of c_i to the insignificant bitstream;
            }
         }   // end of coefficient processing loop
       }   // end of main else clause
    }   // end of procedure
Return
```

As discussed above, if the bit planes of the coefficients are to be divided into three ranges, then two bit plane thresholds are chosen or predefined, and the encoded coefficient values are allocated among three bitstreams using the same technique as described above.

Image Reconstruction

To reconstruct an image from an image file, at a specified resolution level that is equal to or lower than the resolution level at which the base image in the file was encoded, each bitstream of the image file up to the specified resolution level is decompressed and de-quantized. Then, on a tile by tile basis the reconstructed transform coefficients are inverse transformed to reconstruct the image data at specified resolution level.

Figure 12:
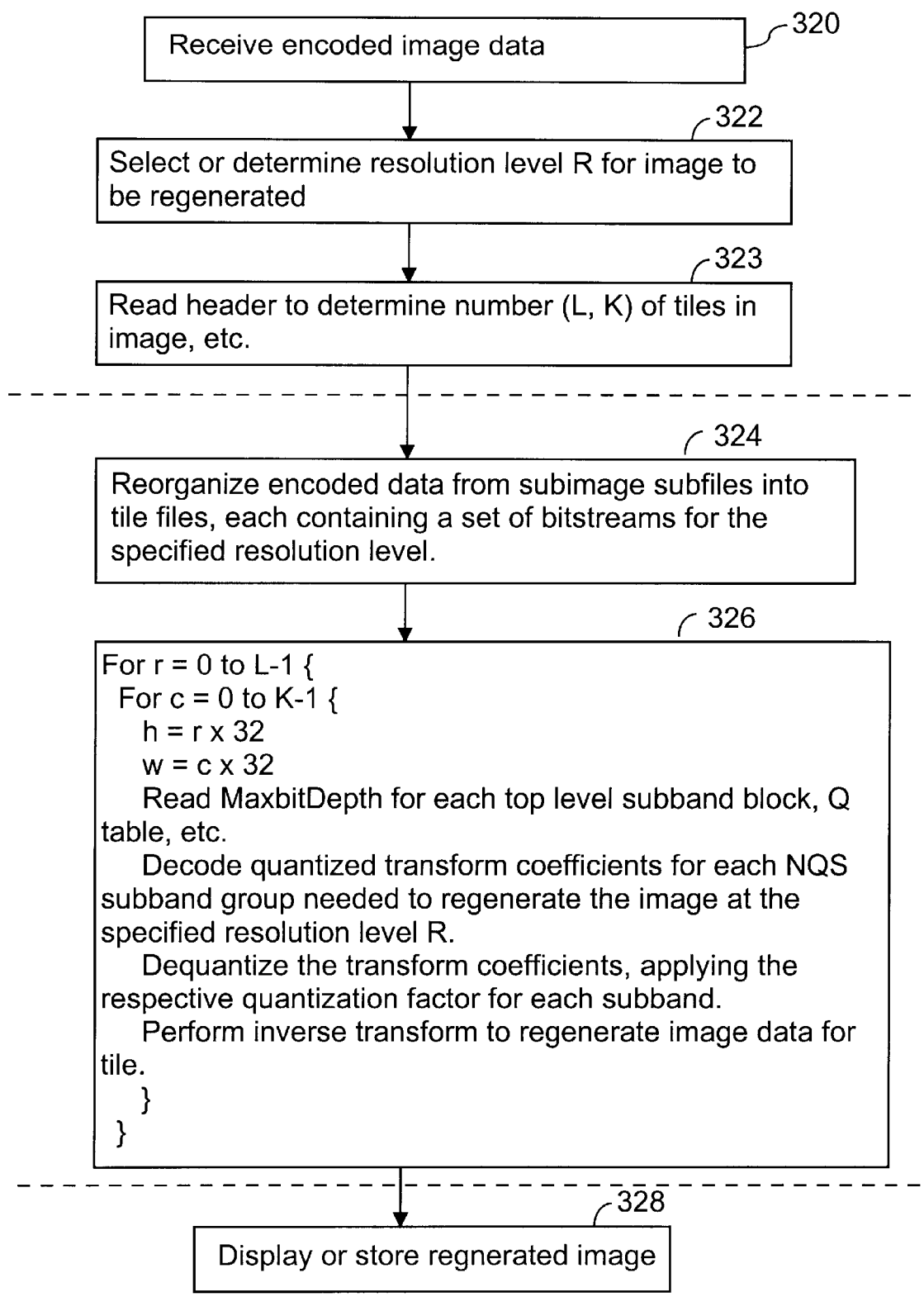
FIG. 12 is a high level flow chart of a compressed image reconstruction process to which the resent invention can be applied.
Figure 13A:
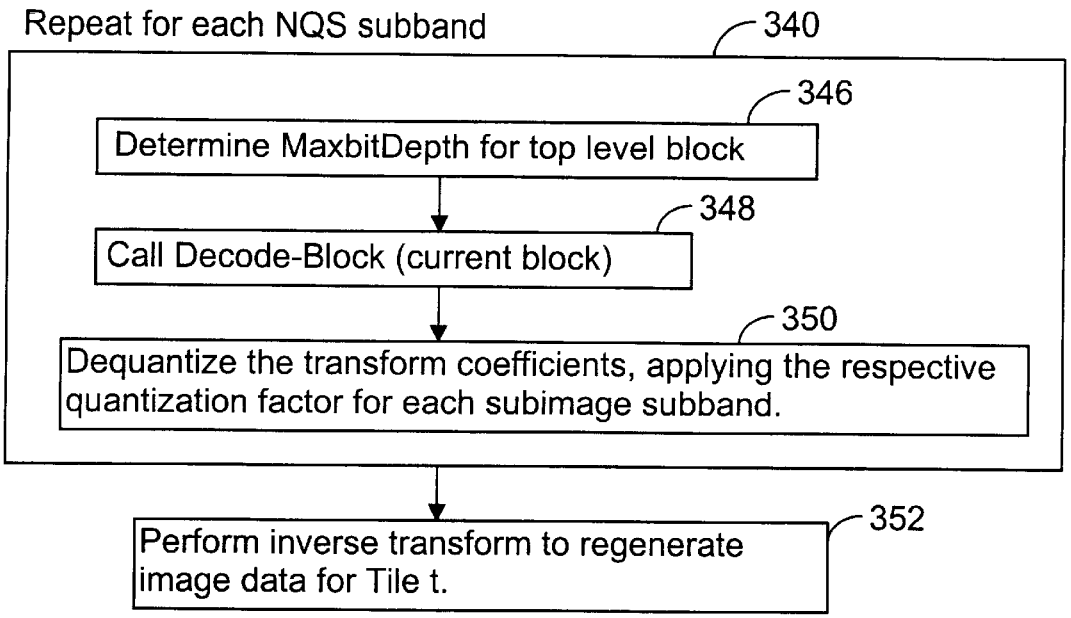
FIGS. 13A and 13B depict a flow chart of a procedure for decoding the transform coefficients for an image and for reconstructing an image from the coefficients.
Figure 13B:
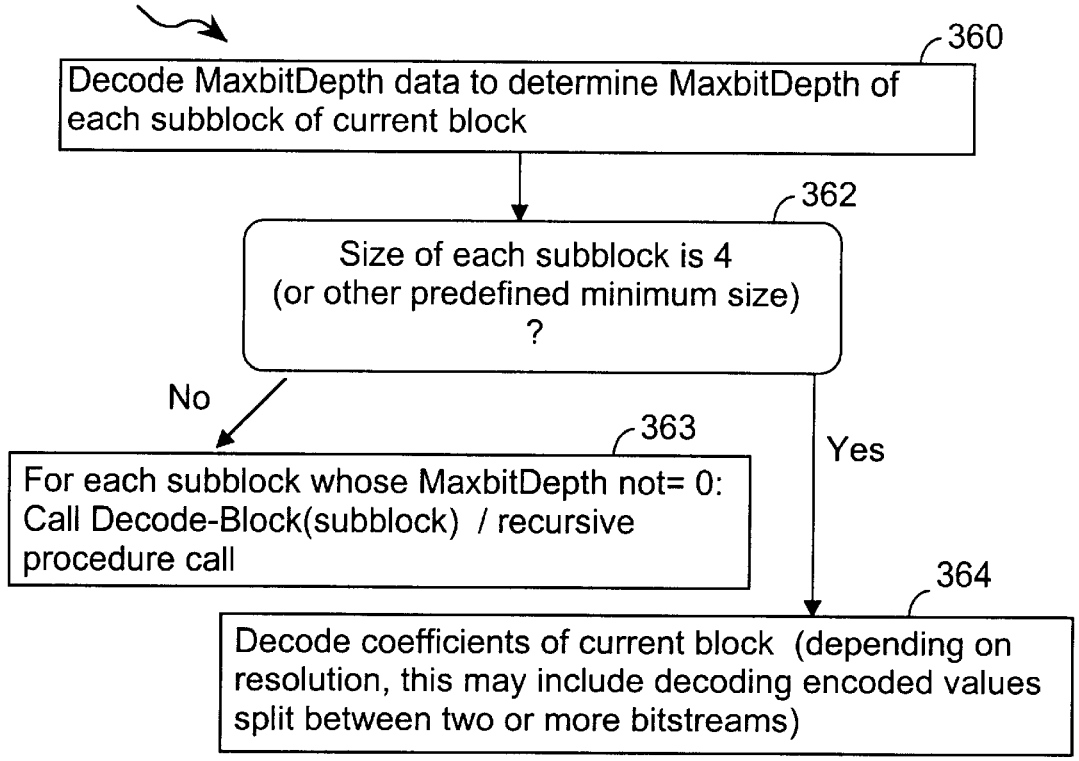

Referring to FIG. 12, the image reconstruction process reconstructs an image from image data received from an image file (320). A user of the procedure or device performing the image reconstruction, or a control procedure operating on behalf of a user, selects or specifies a resolution level R that is equal to or less than the highest resolution level included in the image data (322). A header of the image data file is read to determine the number and arrangement of tiles (L, K) in the image, and other information that may be needed by the image reconstruction procedure (323). Steps 324 and 326 reconstruct the image at the given resolution level, and at step 328 the reconstructed image is displayed or stored in a memory device. FIGS. 13A and 13B provide a more detailed view of the procedure for decoding the data for a particular tile at a particular subimage level.

In one preferred embodiment, as shown in FIG. 12, the data in the image file relevant to the specified resolution level is initially reorganized into tile by tile subfiles, with each tile subfile containing the bitstreams for that tile (324).

Then, the data for each tile is processed (326). The header information is read to determine the MaxbitDepth for each top level subband block of the tile, the quantization factor used to quantize each subimage subband, and the like. The transform coefficients for each NQS subband required to reconstruct the image at the specified resolution level are decoded, in subband order. The details of the decoding process for decoding the coefficients in any one NQS subband are discussed below with reference to FIG. 13B. The resulting decoded coefficients are de-quantized applying the quantization factors for each subband (obtained from the Q table identified in the base image header). Then an inverse transform is applied to the resulting de-quantized coefficients. Note that the wavelet-like inverse transforms for reconstructing an image from the dequantized transform coefficients have been described above.

Referring to FIG. 13A, to decode the data for one tile t at a specified resolution level, a set of steps 340 are repeated to decode each NQS subband of the tile, excluding those NQS subbands not needed for the specified resolution level and also excluding any bitstreams containing bit planes of encoded coefficient values not needed for the specified resolution level. Referring to FIGS. 5D and 5E, only the bitstreams of the base image needed to the specified resolution level are decoded. For a particular top level block (corresponding to a NQS subband) of the tile being decoded, the MaxbitDepth of the top level block is determined from either the header of the tile array (if the data has been reorganized into tile arrays) or from the data at the beginning of the bitstream(s) for the subband (346), and then the Decode-Block procedure is called to decode the data for the current block (348).

After the data for a particular subband has been decoded, the decoded transform coefficients for that subband may be de-quantized, applying the respective quantization factor for the respective (350). Alternately, de-quantization can be performed after all coefficients for all the subbands have been decoded.

Once all the coefficients for the NQS subbands have been decoded and de-quantized, an inverse transform is performed so as to regenerate the image data for the current tile t at the specified resolution level (352).

In an alternate embodiment, step 324 of FIG. 12 is not used and the data in the image file is not reorganized into tile arrays. Rather, the image data is processed on a subband group by subband group basis, requiring the recovered transform coefficients for all the tiles to be accumulated and stored during the initial reconstruction steps. The steps 340 for decoding the data for one top level block of a particular tile for a particular subband group are repeated for each tile. In particular, for a particular top level block of a particular tile of a particular subband group, the MaxbitDepth of the top level block is determined from either the header of the tile array or from the data at the beginning of the bitstream(s) for the subband group (346), and then the Decode-Block procedure is called to decode the data for the current block (348).

Referring to FIG. 13B, the Decode-Block procedure (which is applicable to both the preferred and alternate embodiments mentioned in the preceding paragraphs) begins by decoding the MaxbitDepth data in the applicable encoded data array so as to determine the MaxbitDepth of each subblock of the current block (360). Depending on the NQS subband being decoded, the MaxbitDepth data for a block may be in one bitstream or may be split between two or three bitstreams, as described above, and therefore the applicable MaxbitDepth data bits from all required bitstreams will be read and decoded. If the size of the current block is greater than a predefined minimum block size (362-No), then the Decode-Block procedure is called for each of the subblocks of the current block (363). This is a recursive procedure call. As a result of calling the Decode-Block procedure on a subblock, the MaxbitDepth values for the subblock are decoded. If that subblock is not of the predefined minimum size, then the Decode-Block procedure is recursively called on its subblocks, and so on.

When a block of the predefined minimum size is processed by the Decode-Block procedure (362-Yes), the coefficients of the block are decoded. Depending on the subband group being decoded, the encoded coefficients for a block may be in one bitstream or may be split between two or three bitstreams, as described above, and therefore the applicable data bits from all required bitstreams will be read and decoded.

Referring to FIG. 13A, the quantized transform coefficients for each tile are regenerated for all NQS subbands included in the specified resolution level. After these coefficients have been de-quantized, the inverse transform is applied to each tile (352), as already described.

Embodiment Using Non-Alternating Horizontal and Vertical Transforms

In another preferred embodiment, each tile of the image is first processed by multiple (e.g., five) horizontal decomposition transform layers and then by a similar number of vertical decomposition transform layers. Equivalently, the vertical transform layers could be applied before the horizontal transform layers. In hardware implementations of the image transformation methodology of the present invention, this change in the order of the transform layers has the advantage of either (A) reducing the number of times the data array is rotated, or (B) avoiding the need for circuitry that switches the roles of rows and columns in the working image array(s). When performing successive horizontal transforms, the second horizontal transform is applied to the leftmost array of low frequency coefficients generated by the first horizontal transform, and the third horizontal transform is applied to the leftmost array of low frequency coefficients generated by the second horizontal transform, and so on. Thus, the second through Nth horizontal transforms are applied to twice as much data as in the transform method in which the horizontal and vertical transforms alternate. However, this extra data processing generally does not take any additional processing time in hardware implementations because in such implementations the horizontal filter is applied simultaneously to all rows of the working image array.

The vertical transforms are applied in succession to successively smaller subarrays of the working image array. After the image data has been transformed by all the transform layers (both horizontal and vertical) the quantization and encoding steps described above are applied to the resulting transform coefficients to complete the image encoding process.

As explained above, different (and typically shorter) transform filters may be applied to coefficients near the edges of the arrays being processed than the (typically longer) transform filter applied to coefficients away from those array edges. The use of longer transform filters in the middle provides better data compression than the shorter transform filters, while the shorter transform filters eliminate the need for data and coefficients from neighboring tiles.

Digital Camera Architecture

Figure 14:
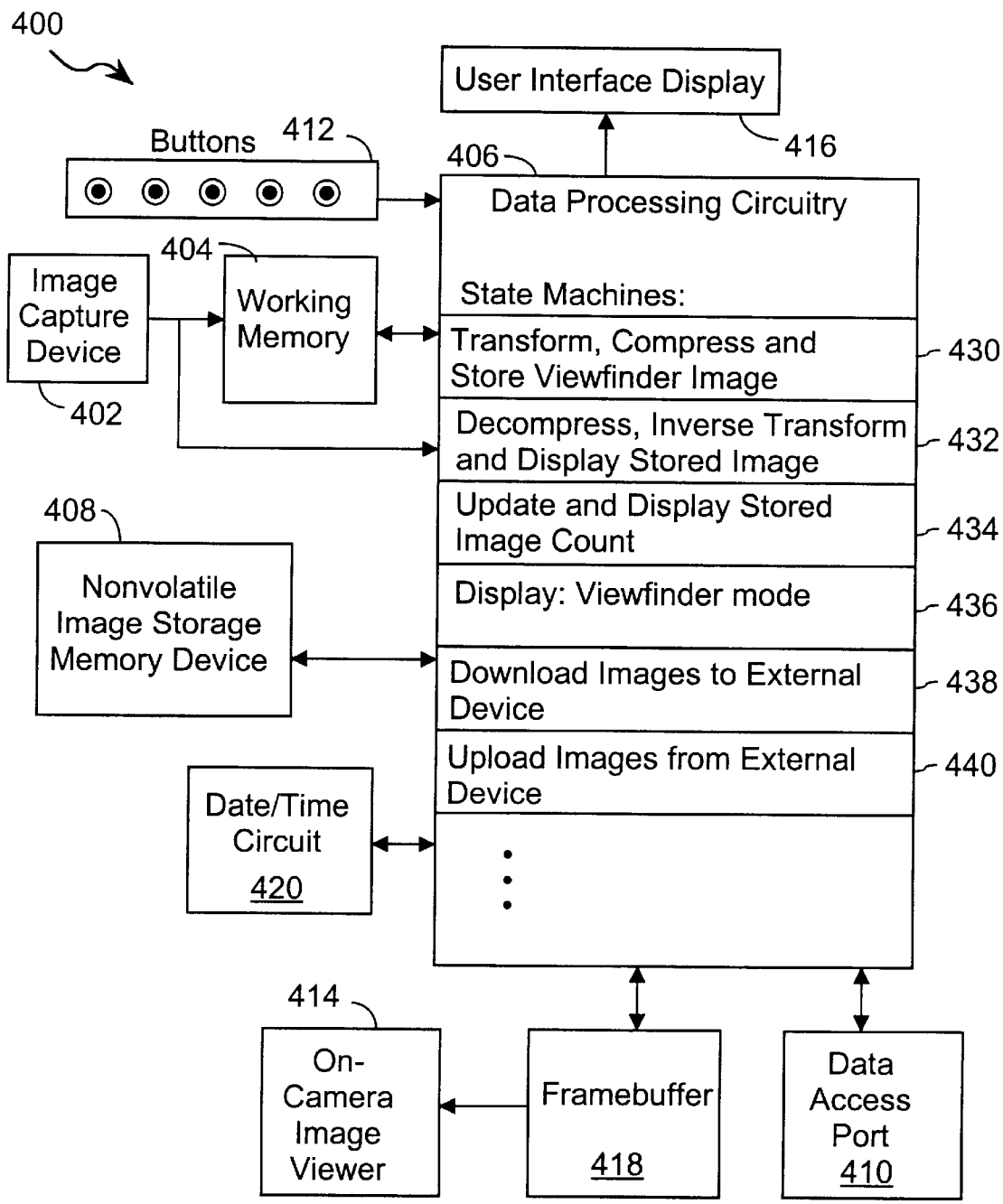
FIG. 14 is a block diagram of a digital camera in which one or more aspects of the present invention are implemented.

Referring to FIG. 14, there is shown an embodiment of a digital camera system 400 in accordance with the present invention. The digital camera system 400 includes an image capture device 402, such as a CCD sensor array or any other mechanism suitable for capturing an image as an array of digitally encoded information. The image capture device is assumed to include analog to digital conversion (ADC) circuitry for converting analog image information into digital values.

A working memory 404, typically random access memory, receives digitally encoded image information from the image capture device 402. More generally, it is used to store a digitally encoded image while the image is being transformed and compressed and otherwise processed by the camera's data (i.e., image) processing circuitry 406. The data processing circuitry 406 in one embodiment consists of hardwired logic and a set of state machines for performed a set of predefined image processing operations.

In alternate embodiments the data processing circuitry 406 could be implemented in part or entirely using a fast general purpose microprocessor and a set of software procedures. However, at least using the technology available in 2000, it would be difficult to process and store full resolution images (e.g., full color images having 1280×840 pixels) fast enough to enable the camera to be able to take, say, 20 pictures per second, which is a requirement for some commercial products. If, through the use of parallel processing techniques or well designed software, a low power, general purpose image data microprocessor could support the fast image processing needed by digital cameras, then the data processing circuit 106 could be implemented using such a general purpose microprocessor.

Each image, after it has been processed by the data processing circuitry 406,is typically stored as an "image file" in a nonvolatile memory storage device 408, typically implemented using "flash" (i.e., EEPROM) memory technology. The nonvolatile memory storage device 408 is preferably implemented as a removable memory card. This allows the camera's user to remove one memory card, plug in another, and then take additional pictures. However, in some implementations, the nonvolatile memory storage device 408 may not be removable, in which case the camera will typically have a data access port 410 to enable the camera to transfer image files to and from other devices, such as general purpose, desktop computers. Digital cameras with removable nonvolatile memory 408 may also include a data access port 410.

The digital camera 400 includes a set of buttons 412 for giving commands to the camera. In addition to the image capture button, there will typically be several other buttons to enable the use to select the quality level of the next picture to be taken, to scroll through the images in memory for viewing on the camera's image viewer 414, to delete images from the nonvolatile image memory 408, and to invoke all the camera's other functions. Such other functions might include enabling the use of a flash light source, and transferring image files to and from a computer. The buttons in one embodiment are electromechanical contact switches, but in other embodiments at least some of the buttons may be implemented as touch screen buttons on a user interface display 416, or on the image viewer 414.

The user interface display 416 is typically implemented either (A) as an LCD display device separate from the image viewer 414, or (B) as images displayed on the image viewer 414.

Menus, user prompts, and information about the images stored in the nonvolatile image memory 108 may be displayed on the user interface display 416, regardless of how that display is implemented.

After an image has been captured, processed and stored in nonvolatile image memory 408, the associated image file may be retrieved from the memory 408 for viewing on the image viewer. More specifically, the image file is converted from its transformed, compressed form back into a data array suitable for storage in a framebuffer 418. The image data in the framebuffer is displayed on the image viewer 414. A date/time circuit 420 is used to keep track of the current date and time, and each stored image is date stamped with the date and time that the image was taken.

Still referring to FIG. 14, the digital camera 400 preferably includes data processing circuitry 406 for performing a predefined set of primitive operations, such as performing the multiply and addition operations required to apply a transform to a certain amount of image data, as well as a set of state machines 430–442 for controlling the data processing circuitry so as to perform a set of predefined image handling operations. In one embodiment, the state machines in the digital camera are as follows:

One or more state machines 430 for transforming, compressing and storing an image received from the camera's image capture mechanism. This image is sometimes called the "viewfinder" image, since the image being processed is generally the one seen on the camera's image viewer 414. This set of state machines 430 are the ones that initially generate each image file stored in the nonvolatile image memory 408. Prior to taking the picture, the user specifies the quality level of the image to be stored, using the camera's buttons 412. In a preferred embodiment, the image encoding state machines 430 implement one or more features of the present invention.

One or more state machines 432 for decompressing, inverse transforming and displaying a stored image file on the camera's image viewer. The reconstructed image generated by decompressing, inverse transforming and dequantizing the image data is stored in camera's framebuffer 418 so that it can be viewed on the image viewer 414.

One or more state machines 434 for updating and displaying a count of the number of images stored in the nonvolatile image memory 408. The image count is preferably displayed on the user interface display 416. This set of state machines 434 will also typically indicate what percentage of the nonvolatile image memory 408 remains unoccupied by image files, or some other indication of the camera's ability to store additional images. If the camera does not have a separate interface display 416, this memory status information may be shown on the image viewer 414, for instance superimposed on the image shown in the image viewer 414 or shown in a region of the viewer 414 separate from the main viewer image.

One or more state machines 436 for implementing a "viewfinder" mode for the camera in which the image currently "seen" by the image capture mechanism 402 is displayed on the image viewer 414 to that the user can see the image that would be stored if the image capture button is pressed. These state machines transfer the image received from the image capture device 402, possibly after appropriate remedial processing steps are performed to improve the raw image data, to the camera's framebuffer 418.

One or more state machines 438 for downloading images from the nonvolatile image memory 408 to an external device, such as a general purpose computer.

One or more state machines 440 for uploading images from an external device, such as a general purpose computer, into the nonvolatile image memory 408. This enables the camera to be used as an image viewing device, and also as a mechanism for transferring image files on memory cards.

Alternate Embodiments

Generally, the present invention is useful in any "memory conservative" context where the amount of working memory available is insufficient to process entire images as a single tile, or where a product must work in a variety of environments including low memory environments, or where an image may need to be conveyed over a low bandwidth communication channel or where it may be necessary or convenient to provide an image at a variety of resolution levels.

In streaming data implementations, such as in a web browser that receives compressed images encoded using the present invention, subimages of an image may be decoded and decompressed on the fly, as the data for other higher level subimages of the image are being received. As a result, one or more lower resolution versions of the compressed image may be reconstructed and displayed before the data for the highest resolution version of the image is received (and/or decoded) over a communication channel.

In another alternate embodiment, a different transform than the wavelet-like transform described above could be used.

In alternate embodiments the image tiles could be processed in a different order. For instance, the image tiles could be processed from right to left instead of left to right. Similarly, image tiles could be processed starting at the bottom row and proceeding toward the top row.

The present invention can be implemented as a computer program product that includes a computer program mechanism embedded in a computer readable storage medium. For instance, the computer program product could contain the program modules shown in FIG. 2. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of processing an array of image data, comprising:

applying a predefined family of transform filters to the array of image data so as to generate successive sets of transform coefficients, each set of transform coefficients including edge coefficients at outside boundaries of the set of transform coefficients and non-edge coefficients positioned at interior locations of the set of transform coefficients; the sets of transform coefficients including a last set of transform coefficients and one or more earlier sets of transform coefficients; and the applying including applying a short transform filter to image data at boundaries of the array and to coefficients positioned at boundaries of each earlier set of transform coefficients so as to generate the edge coefficients, and applying a long filter to image data at interior locations of the array and to coefficients at interior locations of the earlier sets of transform coefficients so as to generate the non-edge coefficients; wherein the boundaries of the array and the interior locations of the array are predetermined without respect to content of the array; wherein the short transform filter has a shorter filter support than the long transform filter, and both the short transform filter and the long transform filter are applied only to image data within the array and only to transform coefficients within the earlier sets of transform coefficients for the array while generating the sets of transform coefficients.

2. The method of claim 1, wherein the short transform filter includes a short low spatial frequency filter that generates low spatial frequency coefficients, and the short low spatial frequency filter weights the image datum closest to the boundary of the array and the transform coefficient closest to the boundary of each earlier set of transform coefficients so as to as enable regeneration of the image from the transform coefficients without array boundary artifacts.

3. The method of claim 2, wherein the short low spatial frequency filter weights the transform coefficient closest to the boundary of one of the earlier set of transform coefficients so that more than 50% of the edge transform coefficient generated by the filter for a next set of transform coefficients is attributable to the transform coefficient closest to the boundary of one of the earlier sets of transform coefficients, said next set of transform coefficients comprising one of said sets of transform coefficients.

4. The method of claim 1, wherein a plurality of the transform filters are asymmetric boundary filters, extending to a first extent to each array's boundary, and extending to a second, longer, extent in a direction away from the array's boundary, but not extending over the array's boundary.

5. The method of claim 1, wherein the transform filters are wavelet or wavelet-like decomposition transform filters.

6. The method of claim 1, wherein the long filter includes a center filter, applied to image data at a predefined set of array locations within the interior locations, for generating a set of center high pass and low pass transform coefficients and the long filter furthermore includes first and second distinct interior filters, wherein the first interior filter is applied to array locations on a first side of the predefined set of array locations and the second interior filter is applied to array locations on a distinct, second side of the predefined set of array locations.

7. A method of processing an array of image data, comprising:

processing tiles of the image data in a predefined order, the tiles comprising nonoverlapping portions of the image data, so as to generate processed image data; and storing the processed image data as a data image file;

the processing of each tile of image data comprising:

applying a predefined family of transform filters to the tile of image data so as to generate successive sets of transform coefficients, each set of transform coefficients including edge coefficients positioned at outside boundaries of the set of transform coefficients and non-edge coefficients positioned at interior locations of the set of transform coefficients; the sets of transform coefficients including a last set of transform coefficients and one or more earlier sets of transform coefficients; and the applying including applying a short transform filter to image data at boundaries of the tile and to coefficients positioned at boundaries of each earlier set of transform coefficients so as to generate the edge coefficients, and applying a long filter to image data at interior locations of the tile and to coefficients at interior locations of the earlier sets of transform coefficients so as to generate the non-edge coefficients; wherein the boundaries of the array and the interior locations of the array are predetermined without respect to content of the array;

wherein the short transform filter has a shorter filter support than the long transform filter, and both the short transform filter and the long transform filter are applied only to image data within the tile and only to transform coefficients within the earlier sets of transform coefficients for the tile while generating the sets of transform coefficients.

8. The method of claim 7, wherein the processing of each tile includes:

for at least two of the respective sets of transform coefficients, generating one or more parameters whose value is indicative of density of image features in the tile;

classifying the tile into one of a predefined set of categories in accordance with the values of the one or more parameters;

selecting a set of quantization factors for each respective tile in accordance with the category into which the tile has been classified; and scaling the transform coefficients of the tile by the set of quantization factors to as to generate a set of quantized transform coefficients for the tile.

9. The method of claim 8, including storing in the image data file an indication of the selected set of quantization factors for each tile of the image data.

10. A computer program product for use in conjunction with a computer system, the computer program product comprising a computer readable storage medium and a computer program mechanism embedded therein, the computer program mechanism comprising:

an image processing module that applies a predefined family of transform filters to the array of image data so as to generate successive sets of transform coefficients, each set of transform coefficients including edge coefficients positioned at outside boundaries of the set of transform coefficients and non-edge coefficients positioned at interior locations of the set of transform coefficients; the sets of transform coefficients including a last set of transform coefficients and one or more earlier sets of transform coefficients; and the predefined family of transform filters including a short transform filter applied by the image processing module to image data at boundaries of the array and to coefficients positioned at boundaries of each earlier set of transform coefficients so as to generate the edge coefficients, and applying a long filter applied by the image processing module to image data at interior locations of the array and to coefficients at interior locations of the earlier sets of transform coefficients so as to generate the non-edge coefficients; wherein the boundaries of the array and the interior locations of the array are predetermined without respect to content of the array;

wherein the short transform filter has a shorter filter support than the long transform filter, and both the short transform filter and the long transform filter are applied only to image data within the array and only to transform coefficients within the earlier sets of transform coefficients for the array while generating the sets of transform coefficients.

11. The computer program product of claim 10, wherein the short transform filter includes a short low spatial frequency filter that generates low spatial frequency coefficients, and the short low spatial frequency filter weights the image datum closest to the boundary of the array and the transform coefficient closest to the boundary of each earlier set of transform coefficients so as to as enable regeneration of the image from the transform coefficients without array boundary artifacts.

12. The computer program product of claim 11, wherein the short low spatial frequency filter weights the transform coefficient closest to the boundary of one of the earlier set of transform coefficients so that more than 50% of the edge transform coefficient generated by the filter for a next set of transform coefficients is attributable to the transform coefficient closest to the boundary of one of the earlier sets of transform coefficients, said next set of transform coefficients comprising one of said sets of transform coefficients.

13. The computer program product of claim 10, wherein a plurality of the transform filters are asymmetric boundary filters, extending to a first extent to each array's boundary, and extending to a second, longer, extent in a direction away from the array's boundary, but not extending over the array's boundary.

14. The computer program product of claim 10, wherein the transform filters are wavelet or wavelet-like decomposition transform filters.

15. The computer program product of claim 10, wherein the interior filter includes a center filter, applied to image data at a predefined set of array locations within the interior locations, for generating a set of center high pass and low pass transform coefficients and the interior filter furthermore includes first and second distinct interior filters, wherein the first interior filter is applied to array locations on a first side of the predefined set of array locations and the second interior filter is applied to array locations on a distinct, second side of the predefined set of array locations.

16. A computer program product for use in conjunction with a computer system, the computer program product comprising a computer readable storage medium and a computer program mechanism embedded therein, the computer program mechanism comprising:

an image processing module that processes tiles of the image data in a predefined order, the tiles comprising nonoverlapping portions of the image data, so as to generate processed image data, and that stores the processed image data as a data image file;

the image processing module including instructions for processing of each tile of image data, comprising:

instructions for applying a predefined family of transform filters to the tile of image data, so as to generate successive sets of transform coefficients, each set of transform coefficients including edge coefficients positioned at outside boundaries of the set of transform coefficients and non-edge coefficients positioned at interior locations of the set of transform coefficients; the sets of transform coefficients including a last set of transform coefficients and one or more earlier sets of transform coefficients; and the instructions for applying a predefined family of transform filters including instructions for applying a short transform filter to image data at boundaries of the tile and to coefficients positioned at boundaries of each earlier set of transform coefficients so as to generate the edge coefficients, and for applying a long filter to image data at interior locations of the tile and to coefficients at interior locations of the earlier sets of transform coefficients so as to generate the non-edge coefficients; wherein the boundaries of the array and the interior locations of the array are predetermined without respect to content of the array;

wherein the short transform filter has a shorter filter support than the long transform filter, and both the short transform filter and the long transform filter are applied only to image data within the tile and only to transform coefficients within the earlier sets of transform coefficients for the tile while generating the sets of transform coefficients.

17. The computer program product of claim 16, wherein the image processing module includes:

instructions for generating, for at least two of the respective sets of transform coefficients, one or more parameters whose value is indicative of density of image features in the tile;

instructions for classifying the tile into one of a predefined set of categories in accordance with the values of the one or more parameters;

instructions for selecting a set of quantization factors for each respective tile in accordance with the category into which the tile has been classified; and instructions for scaling the transform coefficients of the tile by the set of quantization factors to as to generate a set of quantized transform coefficients for the tile.

18. The computer program product of claim 17, including instructions for storing in the image data file an indication of the selected set of quantization factors for each tile of the image data.

19. A method of processing an array of image data, comprising:

applying a predefined family of transform filters to the array of image data so as to generate successive sets of transform coefficients, including applying a first family of transform filters to the array of image data so as to generate a first set of transform coefficients and applying a second family of transform filters to the first set of transform coefficients so as to generate a second set of transform coefficients; wherein applying the first family of transform filters includes applying a first short transform filter to image data at boundaries of the array and a first long transform filter to image data at interior locations of the array, and applying the second family of transform filters includes applying a second short transform filter to edge coefficients at boundaries of the first set of transform coefficients and a second long transform filter to coefficients at interior locations of the first set of transform coefficients; wherein the boundaries of the array and the first set of transform coefficients, and the interior locations of the array and the first set of transform coefficients are predetermined without respect to content of the array and the first set of transform coefficients;

wherein the first family of transform filters have shorter filter supports than the second family of transform filters.

20. The method of claim 19, including applying the second family of transform filters to the second set of transform coefficients so as to generate a third set of transform coefficients and applying the second family of transform filters to the third set of transform coefficients so as to generate a fourth set of transform coefficients wherein applying the second family of transform filters includes applying the second short transform filter to edge coefficients at boundaries of the second and the third set of transform coefficients and applying the second long transform filter to coefficients at interior locations of the second and the third set of transform coefficients; wherein the boundaries of the second and the third set of transform coefficients, and the interior locations of the second and the third set of transform coefficients are predetermined without respect to content of the second and the third set of transform coefficients.

21. A computer program product for use in conjunction with a computer system, the computer program product comprising a computer readable storage medium and a computer program mechanism embedded therein, the computer program mechanism comprising:

an image processing module that applies a predefined family of transform filters to the array of image data so as to generate successive sets of transform coefficients, each set of transform coefficients including edge coefficients positioned at outside boundaries of the set of transform coefficients and non-edge coefficients positioned at interior locations of the set of transform coefficients;

the predefined family of transform filters including a first family of transform filters applied by the image processing module to the array of image data so as to generate a first set of transform coefficients and a second family of transform filters applied by the image processing module to the first set of transform coefficients so as to generate a second set of transform coefficients; wherein the image processing module applies a first short transform filter to image data at boundaries of the array and a first long transform filter to image data at interior locations of the array, and the image processing module applies a second short transform filter to edge coefficients at boundaries of the first set of transform coefficients and a second long transform filter to coefficients at interior locations of the first set of transform coefficients; wherein the boundaries of the array and the first set of transform coefficients, and the interior locations of the array and the first set of transform coefficients are predetermined without respect to content of the array and the first set of transform coefficients;

wherein the first family of transform filters have shorter filter supports than the second family of transform filters.

22. The computer program product of claim 21, wherein the image processing module includes instructions for applying the second family of transform filters to the second set of transform coefficients so as to generate a third set of transform coefficients and for applying the second family of transform filters to the third set of transform coefficients so as to generate a fourth set of transform coefficients wherein applying the second family of transform filters includes applying the second short transform filter to edge coefficients at boundaries of the second and the third set of transform coefficients and applying the second long transform filter to coefficients at interior locations of the second and the third set of transform coefficients; wherein the boundaries of the second and the third set of transform coefficients, and the interior locations of the second and the third set of transform coefficients are predetermined without respect to content of the second and the third set of transform coefficients.

* * * * *